United States Patent
Sakhnini et al.

(10) Patent No.: US 12,471,048 B2
(45) Date of Patent: Nov. 11, 2025

(54) COMMUNICATING TIMING INFORMATION VIA SYSTEM INFORMATION

(71) Applicant: QUALCOMM Incorporated, San Diego, CA (US)

(72) Inventors: Iyab Issam Sakhnini, San Diego, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 17/899,432

(22) Filed: Aug. 30, 2022

(65) Prior Publication Data

US 2024/0073844 A1 Feb. 29, 2024

(51) Int. Cl.
*H04W 56/00* (2009.01)
(52) U.S. Cl.
CPC ....... *H04W 56/005* (2013.01); *H04W 56/001* (2013.01)
(58) Field of Classification Search
CPC ............. H04W 56/005; H04W 56/001; H04W 56/0045
See application file for complete search history.

(56) References Cited

U.S. PATENT DOCUMENTS

| | | | |
|---|---|---|---|
| 2013/0058315 A1* | 3/2013 | Feuersanger | H04W 52/346 370/336 |
| 2019/0174438 A1* | 6/2019 | Zhang | H04W 72/0453 |
| 2021/0392597 A1* | 12/2021 | Xu | H04W 56/009 |

(Continued)

FOREIGN PATENT DOCUMENTS

WO WO-2024009196 A1 * 1/2024 ............... H04L 1/08

OTHER PUBLICATIONS

Qualcomm Incorporated, "Network energy saving techniques", RAN WG1, e-Meeting; May 9, 2022-May 20, 2022, Apr. 29, 2022 (Apr. 29, 2022), 3GPP Draft; R1-2205046, 3GPP, Mobile Competence Centre ; 650, Route Des Lucioles ; F-06921 Sophia-Antipolis Cedex ; France (Year: 2022).*

(Continued)

*Primary Examiner* — Charles C Jiang
*Assistant Examiner* — Margaret Marie Anderson
(74) *Attorney, Agent, or Firm* — QUALCOMM Incorporated

(57) ABSTRACT

Methods, systems, and devices for wireless communications are described. A user equipment (UE) may transmit an uplink trigger (ULT) message that indicates a request for a network entity to transmit a system information message including timing information for the UE. In response to the ULT message, the UE may receive the system information message indicating a timing advance (TA) command applicable to the UE. In some examples, the system information message may indicate that the TA command is applicable to a group of UEs that include the UE and one or more additional UEs. In some other examples, the system information message may indicate the TA command and a set of one or more additional TA commands, each applicable to a respective additional UE. The UE may communicate with the network entity according to a timing based on the TA command received via the system information message.

26 Claims, 17 Drawing Sheets

(56) References Cited

U.S. PATENT DOCUMENTS

2022/0078697 A1* 3/2022 Tseng ................. H04W 72/21
2022/0086780 A1* 3/2022 Tsai .................... G01S 19/05

OTHER PUBLICATIONS

3GPP TS 38.321 version 15.3.0 Release 15, ETSI TS 138 321 V15.3.0 (Sep. 2018) (Year: 2018).*
3GPP TS 38.213 version 15.3.0 Release 15, ETSI TS 138 213 V15.3.0 (Oct. 2018) (Year: 2018).*
3GPP TS 38.300, V17.1.0 (Jun. 2022) (Year: 2022).*

* cited by examiner

COMMUNICATING TIMING INFORMATION VIA SYSTEM INFORMATION

FIELD OF TECHNOLOGY

The following relates to wireless communications, including communicating timing information via system information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may communicate with a network entity according to a timing advance command.

SUMMARY

The described techniques relate to improved methods, systems, devices, and apparatuses that support communicating timing information via system information. For example, the described techniques provide for a user equipment (UE) to receiving support timing advance (TA) commands via system information in response to transmitting an uplink trigger (ULT) message transmitted by the UE. For example, a UE may transmit a ULT message that indicates a request for a network entity to transmit a system information message including timing information for the UE. In response to the ULT message, the UE may receive the system information message indicating a TA command applicable to the UE (e.g., to at least the UE). In some examples, the system information message may indicate that the TA command is applicable to a group of UEs that include the UE and one or more additional UEs. In some other examples, the system information message may indicate the TA command and a set of one or more additional TA commands, each applicable to a respective additional UE. The UE may communicate with the network entity according to a timing based on the TA command received via the system information message.

A method for wireless communication at a UE is described. The method may include transmitting, to a network entity, a ULT message that indicates a request for the network entity to transmit a system information message that includes uplink timing information for the UE, receiving, from the network entity, the system information message including a TA command applicable to at least the UE at least in part in response to the ULT message, and communicating with the network entity according to a timing that is based on the TA command received via the system information message.

An apparatus for wireless communication at a UE is described. The apparatus may include a processor, memory coupled with the processor, and instructions stored in the memory. The instructions may be executable by the processor to cause the apparatus to transmit, to a network entity, a ULT message that indicates a request for the network entity to transmit a system information message that includes uplink timing information for the UE, receive, from the network entity, the system information message including a TA command applicable to at least the UE at least in part in response to the ULT message, and communicate with the network entity according to a timing that is based on the TA command received via the system information message.

Another apparatus for wireless communication at a UE is described. The apparatus may include means for transmitting, to a network entity, a ULT message that indicates a request for the network entity to transmit a system information message that includes uplink timing information for the UE, means for receiving, from the network entity, the system information message including a TA command applicable to at least the UE at least in part in response to the ULT message, and means for communicating with the network entity according to a timing that is based on the TA command received via the system information message.

A non-transitory computer-readable medium storing code for wireless communication at a UE is described. The code may include instructions executable by a processor to transmit, to a network entity, a ULT message that indicates a request for the network entity to transmit a system information message that includes uplink timing information for the UE, receive, from the network entity, the system information message including a TA command applicable to at least the UE at least in part in response to the ULT message, and communicate with the network entity according to a timing that is based on the TA command received via the system information message.

In some examples of the method, apparatuses, and non-transitory computer-readable medium described herein, receiving the system information message may include operations, features, means, or instructions for receiving the system information message indicating the TA command may be applicable to a group of UEs including the UE and one or more additional UEs.

In some examples of the method, apparatuses, and non-transitory computer-readable medium described herein, the one or more additional UEs may have each requested the system information message via respective ULT messages, the respective ULT messages and the ULT message having a same format.

In some examples of the method, apparatuses, and non-transitory computer-readable medium described herein, the TA command may be based on a smallest round trip delay associated with UEs of the group of UEs.

In some examples of the method, apparatuses, and non-transitory computer-readable medium described herein, receiving the system information message may include operations, features, means, or instructions for receiving the system information message indicating a set of one or more additional TA commands each applicable to a respective additional UE of one or more additional UEs.

In some examples of the method, apparatuses, and non-transitory computer-readable medium described herein, the one or more additional UEs may have each requested the system information message via respective ULT messages, the respective ULT messages and the ULT message having different formats.

Some examples of the method, apparatuses, and non-transitory computer-readable medium described herein may further include operations, features, means, or instructions for transmitting the ULT message indicating an identifier (ID) of the UE in association with the request to transmit the system information message and receiving the system information message indicating that the TA command may be associated with the ID of the UE.

Some examples of the method, apparatuses, and non-transitory computer-readable medium described herein may further include operations, features, means, or instructions for receiving the system information message indicating for the UE to transmit additional signaling identifying the UE, transmitting, to the network entity and in accordance with the timing that may be based on the TA command, the additional signaling identifying the UE, receiving, from the network entity, unicast signaling including a second TA command at least in part in response to the additional signaling identifying the UE, and communicating with the network entity according to a second timing that may be based on the second TA command.

In some examples of the method, apparatuses, and non-transitory computer-readable medium described herein, the system information message indicates for the UE to transmit the additional signaling identifying the UE based on a difference in timing between the request for transmission of the system information message from the UE and an additional request for transmission of the system information message from an additional UE.

In some examples of the method, apparatuses, and non-transitory computer-readable medium described herein, the system information message indicates for the UE to transmit the additional signaling identifying the UE based on a collision between the request for transmission of the system information message from the UE and an additional request for transmission of the system information message from an additional UE.

In some examples of the method, apparatuses, and non-transitory computer-readable medium described herein, the system information message includes a synchronization signal block (SSB), a system information block (SIB), minimum system information (MSI), or any combination thereof.

In some examples of the method, apparatuses, and non-transitory computer-readable medium described herein, transmitting the request to transmit the system information message may include operations, features, means, or instructions for transmitting the request via a random access channel (RACH).

In some examples of the method, apparatuses, and non-transitory computer-readable medium described herein, transmitting the request to transmit the system information message may include operations, features, means, or instructions for transmitting the request based on detecting a SSB associated with the network entity, a keep alive signal (KAS) associated with the network entity, or both.

A method for wireless communication at a network entity is described. The method may include obtaining a ULT message that indicates a request for the network entity to transmit a system information message that includes timing information for a UE, outputting the system information message including a TA command applicable to at least the UE at least in part in response to the request for transmission of the system information message, and communicating with the UE according to a timing that is based on the TA command received via the system information message.

An apparatus for wireless communication at a network entity is described. The apparatus may include a processor, memory coupled with the processor, and instructions stored in the memory. The instructions may be executable by the processor to cause the apparatus to obtain a ULT message that indicates a request for the network entity to transmit a system information message that includes timing information for a UE, output the system information message including a TA command applicable to at least the UE at least in part in response to the request for transmission of the system information message, and communicate with the UE according to a timing that is based on the TA command received via the system information message.

Another apparatus for wireless communication at a network entity is described. The apparatus may include means for obtaining a ULT message that indicates a request for the network entity to transmit a system information message that includes timing information for a UE, means for outputting the system information message including a TA command applicable to at least the UE at least in part in response to the request for transmission of the system information message, and means for communicating with the UE according to a timing that is based on the TA command received via the system information message.

A non-transitory computer-readable medium storing code for wireless communication at a network entity is described. The code may include instructions executable by a processor to obtain a ULT message that indicates a request for the network entity to transmit a system information message that includes timing information for a UE, output the system information message including a TA command applicable to at least the UE at least in part in response to the request for transmission of the system information message, and communicate with the UE according to a timing that is based on the TA command received via the system information message.

In some examples of the method, apparatuses, and non-transitory computer-readable medium described herein, outputting the system information message may include operations, features, means, or instructions for outputting the system information message indicating the TA command may be applicable to a group of UEs including the UE and one or more additional UEs.

In some examples of the method, apparatuses, and non-transitory computer-readable medium described herein, the one or more additional UEs may have each requested the system information message via respective ULT messages, the respective ULT messages and the ULT message having a same format.

In some examples of the method, apparatuses, and non-transitory computer-readable medium described herein, the TA command may be based on a smallest round trip delay associated with UEs of the group of UEs.

In some examples of the method, apparatuses, and non-transitory computer-readable medium described herein, outputting the system information message may include operations, features, means, or instructions for outputting the system information message indicating a set of one or more additional TA commands each applicable to a respective additional UE of one or more additional UEs.

In some examples of the method, apparatuses, and non-transitory computer-readable medium described herein, the one or more additional UEs may have each requested the system information message via respective ULT messages, the respective ULT messages and the ULT message having different formats.

Some examples of the method, apparatuses, and non-transitory computer-readable medium described herein may further include operations, features, means, or instructions for obtaining the ULT message indicating an ID of the UE in association with the request to transmit the system information message and outputting the system information message indicating that the TA command may be associated with the ID of the UE.

Some examples of the method, apparatuses, and non-transitory computer-readable medium described herein may further include operations, features, means, or instructions for outputting the system information message indicating for the UE to transmit additional signaling identifying the UE, obtaining, in accordance with the timing that may be based on the TA command, the additional signaling identifying the UE, outputting unicast signaling including a second TA command at least in part in response to the additional signaling identifying the UE, and communicating with the UE according to a second timing that may be based on the second TA command.

In some examples of the method, apparatuses, and non-transitory computer-readable medium described herein, the system information message indicates for the UE to transmit the additional signaling identifying the UE based on a difference in timing between the request for transmission of the system information message from the UE and an additional request for transmission of the system information message from an additional UE.

In some examples of the method, apparatuses, and non-transitory computer-readable medium described herein, the system information message indicates for the UE to transmit the additional signaling identifying the UE based on a collision between the request for transmission of the system information message from the UE and an additional request for transmission of the system information message from an additional UE.

In some examples of the method, apparatuses, and non-transitory computer-readable medium described herein, the system information message includes a SSB, a SIB, MSI, or any combination thereof.

In some examples of the method, apparatuses, and non-transitory computer-readable medium described herein, obtaining the request to transmit the system information message may include operations, features, means, or instructions for obtaining the request via a RACH.

Some examples of the method, apparatuses, and non-transitory computer-readable medium described herein may further include operations, features, means, or instructions for outputting a SSB, a KAS, or both, where the ULT message indicating the request for the network entity to transmit the system information message may be based on the SSB, the KAS, or both.

DETAILED DESCRIPTION

Figure 1:
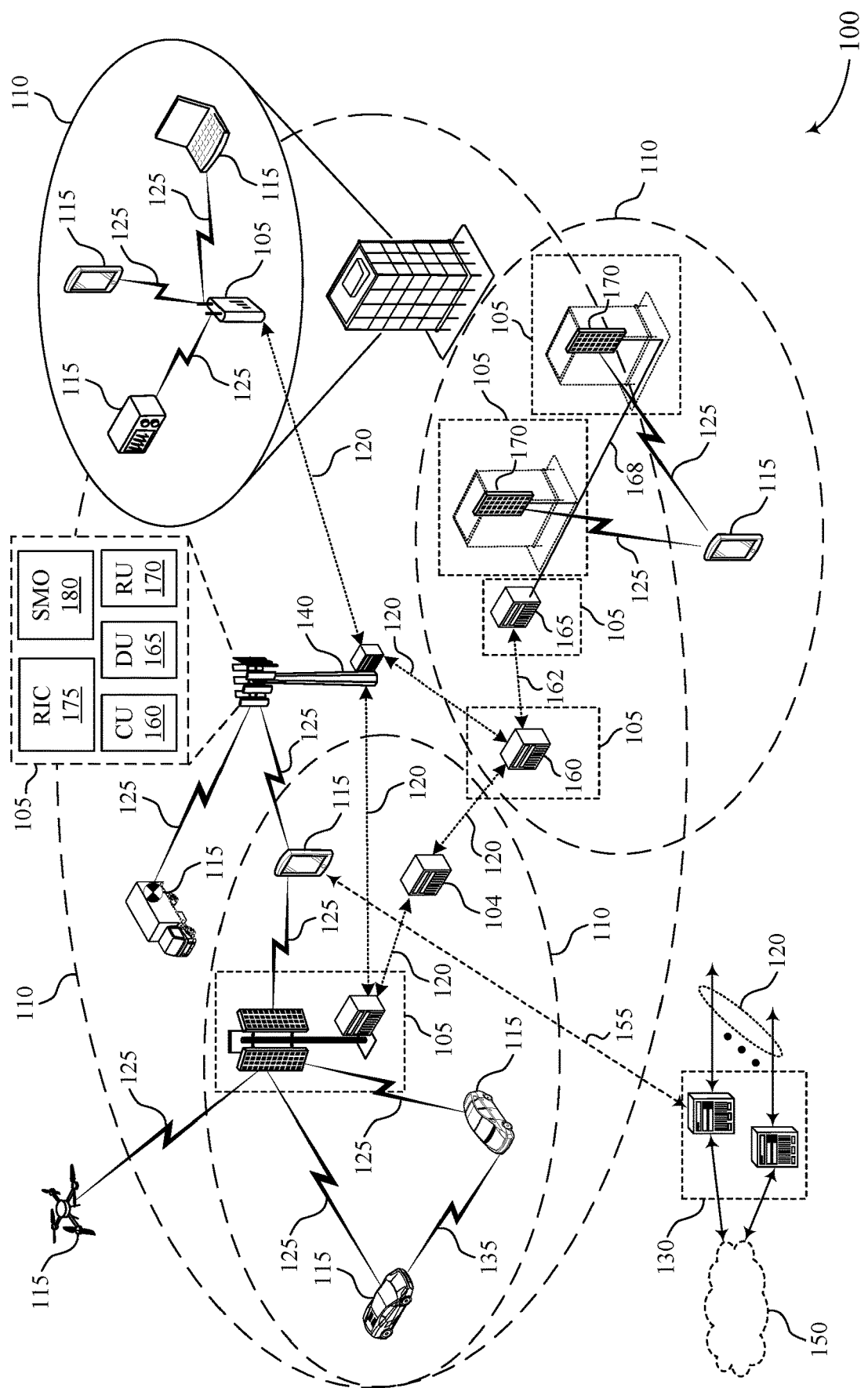
FIG. 1 through 4 illustrate examples of wireless communications systems that supports communicating timing information via system information in accordance with one or more aspects of the present disclosure.

In some wireless communications systems, a user equipment (UE) may communicate with a network entity according to a timing alignment. For example, when establishing a connection with the network entity (e.g., during a random access channel (RACH) procedure), the UE may receive a timing advance (TA) command from the network. The TA command may support the timing alignment for transmissions between multiple UEs and the network entity, such that the network entity may receive transmissions sent from the multiple UEs at a same time (or relatively the same time). In some cases, in addition to, or as an alternative to, the RACH procedure, one or more UEs may transmit an uplink trigger (ULT) message, which may request transmission of system information from a network entity, such as a synchronization signal block (SSB), minimum system information (MSI), or one or more system information blocks (SIBs). The UE(s) may access and communicate with the network based on receiving system information in response to a ULT. However, in such cases, the network entity may not respond to the ULT message with a corresponding TA command for the one or more UEs, resulting in decreased communication quality and increased latency, among other disadvantages.

The techniques described herein may support including a TA command applicable to at least one UE within system information transmitted in response to one or more ULT messages. In some implementations, a group of UEs (e.g., multiple UEs) may transmit a common ULT message to the network entity indicating a request for system information. In response, the network entity may transmit a common TA applicable to the group of UEs, such that the group of UEs may transmit uplink transmissions to the network entity according to the common TA. In some examples, in response to the common ULT messages from the group of UEs (e.g., to refine TA commands for the group of UEs) the network entity may transmit a request for additional signaling (e.g., a follow up ULT message or RACH sequence) that indicates a UE identifier (ID). The network entity may transmit unicast signaling (e.g., transmit respective control signaling to each UE) to each UE that includes a respectively updated TA command for a respective UE based on the received UE IDs. Thus, each UE of the group of UEs may communicate with the network entity according to respective TA commands received via the unicast signaling.

In some other implementations, multiple UEs may each transmit a respective ULT message using a different ULT format. In response to the ULT messages, the network entity may transmit system information to the multiple UEs, where the system information may include TA commands for each UE of the multiple UEs (e.g., respectively distinguished based on a UE ID). In such implementations, each UE of the multiple UEs may identify the corresponding TA command based on the UE IDs. Thus, each UE of the multiple UEs may communicate with the network entity according to a respective TA command. In some cases, a ULT message from a first UE and a ULT message from a second UE may interfere (e.g., collide) with one another. In such cases, the network entity may transmit a request for additional signaling, indicating a respective UE ID, from the first UE and the second UE. In response to receiving the additional signaling from the first and second UEs, the network entity may transmit respective unicast signaling indicating a respective TA command for the first and second UE. According to the examples described herein, the network entity and one or more UEs may support inclusion of one or more TA commands in system information, in response to ULT messages, thereby reducing latency and increasing communication quality in the wireless communications system.

Aspects of the disclosure are initially described in the context of wireless communications systems, as described herein with reference to FIGS. 1 through 4. Aspects of the disclosure are further illustrated by and described with reference to a process flow, as described in FIG. 5. Aspects of the disclosure are further illustrated by and described with reference to apparatus diagrams, system diagrams, and flowcharts that relate to communicating timing information via system information.

FIG. 1 illustrates an example of a wireless communications system 100 that supports communicating timing information via system information in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support communicating timing information via system information as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems (e.g., 6th generation (6G) wireless communications), a network entity 105 may communicate with one or more UEs 115 via millimeter wave (mmW) beams. As such, the one or more UEs 115 and network entity 105 may experience one or more challenges such as path loss in mmW bands, blockage from environmental obstacles (e.g., user's hands, user's bodies, walls, foliage, among other obstacles), varying UE 115 form factors, permissible exposure requirements, beam pairing, tracking, and recovery, or the like. Additionally, other challenges may exist, such as densifying networks in a cost-effective manner, improving power efficiency, or the like.

To overcome such challenges, the network entity 105 and UE(s) 115 may implement low latency and overhead beam management procedures (e.g., autonomous beam management), mobility functions across network nodes (e.g., gNBs, relays, and smart repeaters), topology enhancements, power efficient radio frequency (RF) frontend and beamforming, power efficient wave forming and modulation, design reuse for sub-THz bands, uplink coverage enhancements, power savings, power efficient physical layer operations and procedures, enhanced sidelink operations, or the like.

A network entity 105 may include a TA command applicable to at least one UE 115 within system information transmitted in response to a ULT message. In some implementations, a group of UEs 115 (e.g., multiple UEs 115) may transmit a common ULT message to the network entity 105 indicating a request for system information. In response, the network entity 105 may transmit a common TA applicable to the group of UEs 115, such that the group of UEs 115 may transmit uplink transmissions to the network entity 105 according to the common TA. In some other implementations, multiple UEs 115 may transmit respective ULT messages using different ULT formats. In response to the ULT messages, the network entity 105 may transmit system information to the multiple UEs 115, where the system information includes TA commands for each UE 115 of the multiple UEs 115 (e.g., distinguished based on a UE ID). In such implementations, each UE 115 of the multiple UEs 115 may identify the corresponding TA command based on the UE IDs.

Figure 2:
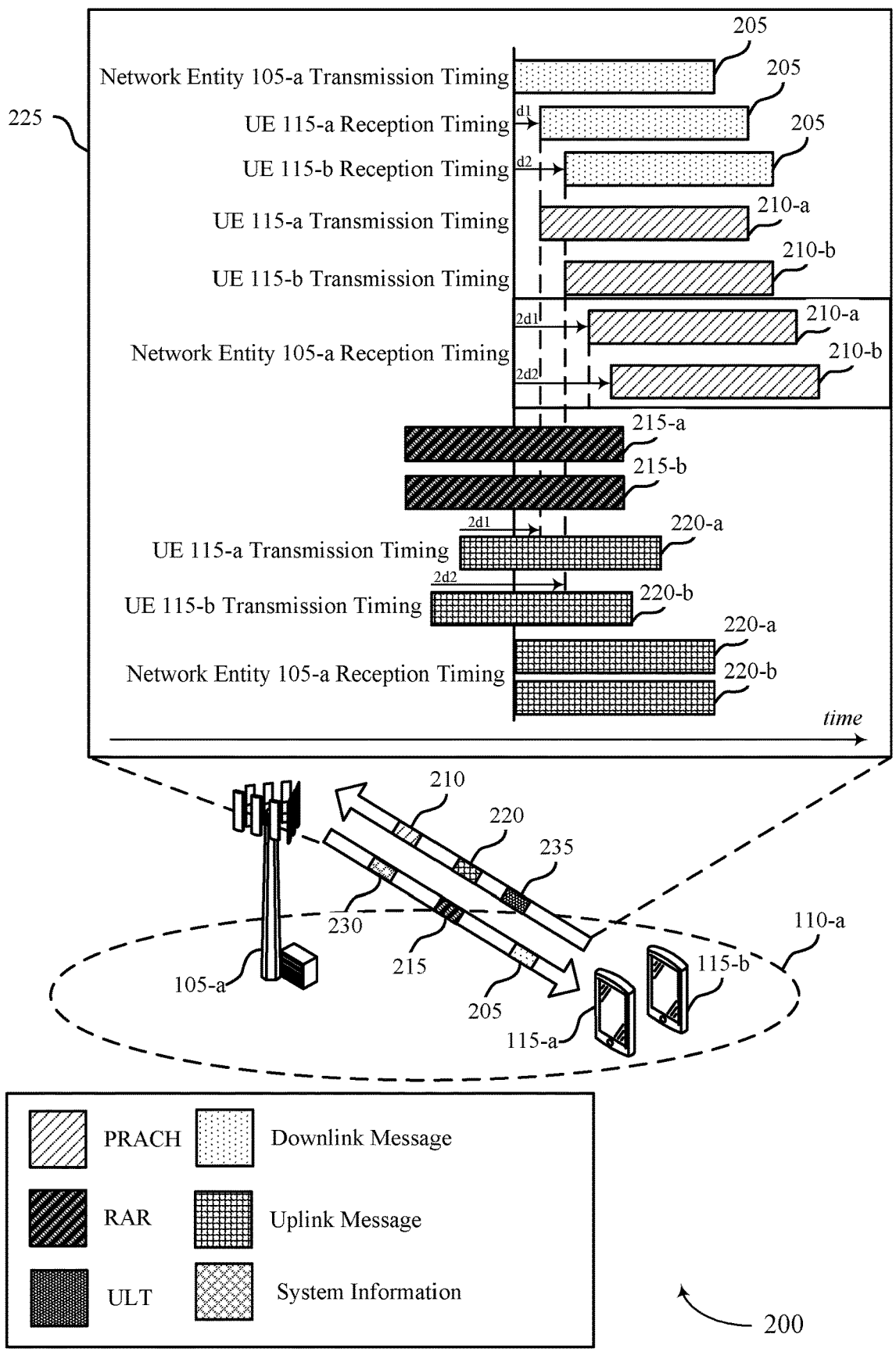

FIG. 2 illustrates an example of a wireless communications system 200 that supports communicating timing information via system information in accordance with one or more aspects of the present disclosure. The wireless communications system 200 may implement, or be implemented by, aspects of the wireless communications system 100. For example, the wireless communications system 200 may include a network entity 105-a, a UE 115-a, and a UE 115-b, which may be examples of corresponding devices described herein with reference to FIG. 1. The network entity 105-a, the UE 115-a, and the UE 115-b may be located within a coverage area 110-a, which may be an example of a coverage area 110 described herein with reference to FIG. 1.

In some examples of the wireless communications system 200, the UE 115-a may perform a RACH procedure to establish a connection with the network entity 105-a. For example, the network entity 105-a may transmit one or more downlink messages 205 (e.g., system information, SSBs) to the UE 115-a. For initial access with the network entity 105-a, the UE 115-a may send a physical RACH (PRACH) 210 (e.g., PRACH preamble, msg1) on a RACH occasion (RO), using a sequence (e.g., a defined sequence). The network entity 105-a may detect the PRACH 210 and respond by transmitting a random access response (RAR) 215 (e.g., msg2). For example, the UE 115-a may detect DCI scrambled with a random access radio network temporary identifier (RA-RNTI) via monitoring a physical downlink control channel (PDCCH) within a RAR window. The DCI may include an indication of resources for a physical downlink shared channel (PDSCH), via which the network entity 105-a may transmit the RAR 215. The UE 115-a may detect the PDSCH and decode the RAR 215.

The RAR 215 may include a TA, a backoff indicator (BI), a random access preamble identifier (RAPID), one or more uplink grants, a temporary cell RNTI (C-RNTI), or a combination thereof. The UE 115-a may apply the indicated TA to transmit one or more uplink messages 220 to the network entity 105-a (e.g., to transmit msg3 of the RACH procedure). In such examples, the TA command may be used to align (e.g., in time) the reception of transmissions from multiple UEs 115 (e.g., UE 115-a and UE 115-b) at the network entity 105-a. In order for these RACH procedures to function, the PRACH format may be configured (e.g., dimensioned) such that the cyclic prefix (CP), the guard period, or both, may be larger than a largest round trip delay time (RTD) for communications from the multiple UEs 115 to the serving cell.

For example, as illustrated in the timing diagram 225, the network entity 105-a may transmit a downlink message 205 to the UE 115-a and the UE 115-b at an initial time frame (e.g., a beginning of a TTI). The UE 115-a may receive the downlink message 205 at a time d1 from the transmission (e.g., at a relative time d1 from the beginning of the TTI). Likewise, the UE 115-a may receive the downlink message 205 at a time d2 from the transmission (e.g., at a relative time d2 from the beginning of the TTI). The difference between d1 and d2 may be due to the respective distance between the network entity 105-a and each UE 115 (e.g., the UE 115-b may be farther away from the network entity 105-a than the UE 115-a). At the d1 time (e.g., in another TTI, based on the previous reception time d1), the UE 115-a may transmit the PRACH 210-a to the network entity 105-a, while at the d2 time (e.g., in another TTI, based on the previous reception time d2) the UE 115-b may transmit PRACH 210-b to the network entity 105-a. Thus, the network entity 105-a may receive the PRACH 210-a at a time 2d1 (e.g., 2*d1, relative to a beginning of a TTI) and may receive the PRACH 210-b at a time 2d2 (e.g., 2*d2, relative to the beginning of the TTI). Thus, the RTD for the UE 115-a may be 2d1, while the RTD time for the UE 115-b may be 2d2.

The network entity 105-a may configure and transmit a RAR 215-a and a RAR 215-b to the UE 115-a and the UE 115-b, respectively. The TA command indicated in the RAR 215-a may be set to a value equal to (e.g., approximately equal to) 2d1, while the TA command indicated in the RAR 215-b may be set to a value equal to (e.g., approximately equal to) 2d2. In response to receiving the RAR 215-a, the UE 115-a may transmit an uplink message 220-a (e.g., msg3) at a time according to the TA command indicated in the RAR 215-a (e.g., 2d1). Likewise, the UE 115-b may receive the RAR 215-b and transmit an uplink message 220-b (e.g., msg3) at a time according to the TA command indicated in the RAR 215-b (e.g., 2d2). That is, the UE 115-b may transmit the uplink message 220-b at a time prior to the transmission of the uplink message 220-a by UE 115-a. Thus, the network entity 105-a may receive the uplink message 220-a and the uplink message 220-b at the same time (or relatively the same time).

In addition to, as an alternative to, or included with the RACH procedure described herein, the network entity 105-a may also transmit system information 230 to the UEs 115, such as an SSB, a SIB, MSI, or a combination thereof (e.g., the network entity 105-*a* may transmit the system information 230 prior to the RACH procedure). The system information 230 may include additional information for the UE 115-*a* and the UE 115-*a* to support establishing and maintaining the connection with the network entity 105-*a*. For example, the UEs 115 may establish the connection with the network entity 105-*a* and maintain communication with the network entity 105-*a* based on periodically repeated transmissions of the system information (e.g., SIB1). However, periodically repeated transmissions of the system information (e.g., SIB1 on PDSCH) may result in increased overhead if repeated for all beams used by the network entity 105-*a*. For example, in some cases, 80 percent or more of downlink transmissions may be taken up by SIB overhead.

Thus, in addition to, or as an alternative to, the RACH procedure, the UE 115-*a*, the UE 115-*b*, or both, may transmit a respective ULT 235 to the network entity 105-*a* to request system information 230, such as and SSB, a SIB, MSI, or a combination thereof. In response to the ULT(s) 235, the network entity 105-*a* may transmit the requested system information 230 (e.g., on-demand or dedicated CORESET0 or SIB1), rather than repeatedly transmitting the system information 230, which may reduce signaling overhead. In such cases, the system information 230 may be transmitted using the respective beam(s) used by the UE(s) 115, which may also reduce overhead.

In some examples, the UE(s) 115 may transmit the ULT 235 in response to receiving a synchronization signal block (SSB) from the network entity 105-*a*, and may request (e.g., and receive) a SIB in response to the ULT 235 (e.g., a SIB1). Additionally, or alternatively, the UE 115-*a* and/or the UE 115-*b* may transmit a ULT 235 based on receiving a keep alive signal (KAS) from the network entity 105-*a*. In some examples, to improve network energy saving (NES), the network entity may transmit a KAS to the UEs 115 to reduce the frequency of transmitting SSBs. Transmitting a KAS may balance the NES of the network, as well as balance the UEs 115 latency and energy consumption. In such examples, the UE(s) 115 may transmit a ULT 235 requesting an SSB, MSI, or both, in response to receiving a KAS.

In some cases, the ULT 235 may be a PRACH based sequence, another sequence (e.g., a pseudo-random number), energy signal, or both. The UE 115-*a* and the UE 115-*b* may transmit a common (identical) ULT 235 (e.g., the same format for ULT 235) or may transmit different ULTs 235 (e.g., different formats for ULT 235).

In a RACH procedure, the network entity 105-*a* may transmit a dedicated RAR 215 to a UE 115 (e.g., the UE 115-*a* or the UE 115-*b*) that sends a PRACH 210 (e.g., a winning UE 115 from a collision standpoint). For example, the RAR 215 may include a TA value for the UE 115-*a* or the UE 115-*b*, but not both. However, in some examples of a ULT 235, the UE 115-*a* and the UE 115-*b* may share the response (e.g., system information 230, such as SIB, SSB, MSI) to a ULT 235 transmitted from the UE 115-*a*, the UE 115-*b*, or both. For example, the UE 115-*a* and the UE 115-*b* may both use the response (e.g., system information including SIB, SSB, or MSI) for the ULT 235 in communications with the network entity 105-*a*.

In one example, the UE 115-*a* and the UE 115-*a* may transmit a respective ULT 235 requesting system information 230 for communications with the network entity 105-*a*. In response, the network entity 105-*a* may transmit the system information 230 to the UE 115-*a* and the UE 115-*b*, such that both the UE 115-*a* and the UE 115-*b* may use the system information 230 in communications with the network entity 105-*a*. Thus, the system information 230 may not be dedicated for a single UE 115 in response to a ULT 235. The system information 230, however, may not be configured to convey a TA command, which may decrease communication quality between the UEs 115 and the network entity 105-*a*. Additionally, in some cases, if the UE 115-*a* and the UE 115-*b* transmit a common (e.g., unified) ULT 235 (e.g., both UEs 115 transmit the same sequence or message), the network entity 105-*a* may not support differentiation between UEs 115 that have transmitted the ULT 235 (e.g., in order to provide a TA to the UEs 115).

Thus, the techniques described herein may support a network entity 105-*a* to include an indication of a TA command applicable to the UE 115-*a*, the UE 115-*b*, or both, within system information 230 transmitted in response to a ULT 235. In some implementations, the UE 115-*a* and the UE 115-*b* may transmit a common ULT 235 to the network entity 105-*a* indicating a request for system information 230. In response, the network entity 105-*a* may transmit the system information 230 including an indication of a common TA applicable to the UE 115-*a* and the UE 115-*b*, for example, according to techniques further described herein with reference to FIG. 3.

In some other implementations, the UE 115-*a* and the UE 115-*b* may transmit respective ULTs 235 (e.g., each UE 115 may transmit using a different ULT format) to the network entity 105-*a*, indicating respective requests for system information 230. In response to the ULTs 235, the network entity 105-*a* may transmit system information 230 including indications of respective TAs for the UE 115-*a* and the UE 115-*b* according to techniques further described herein with reference to FIG. 4. Thus, the network entity 105-*a* may include a TA command in system information 230 in response to a ULT 235, which may increase communication quality in the wireless communications system 200.

Figure 3:
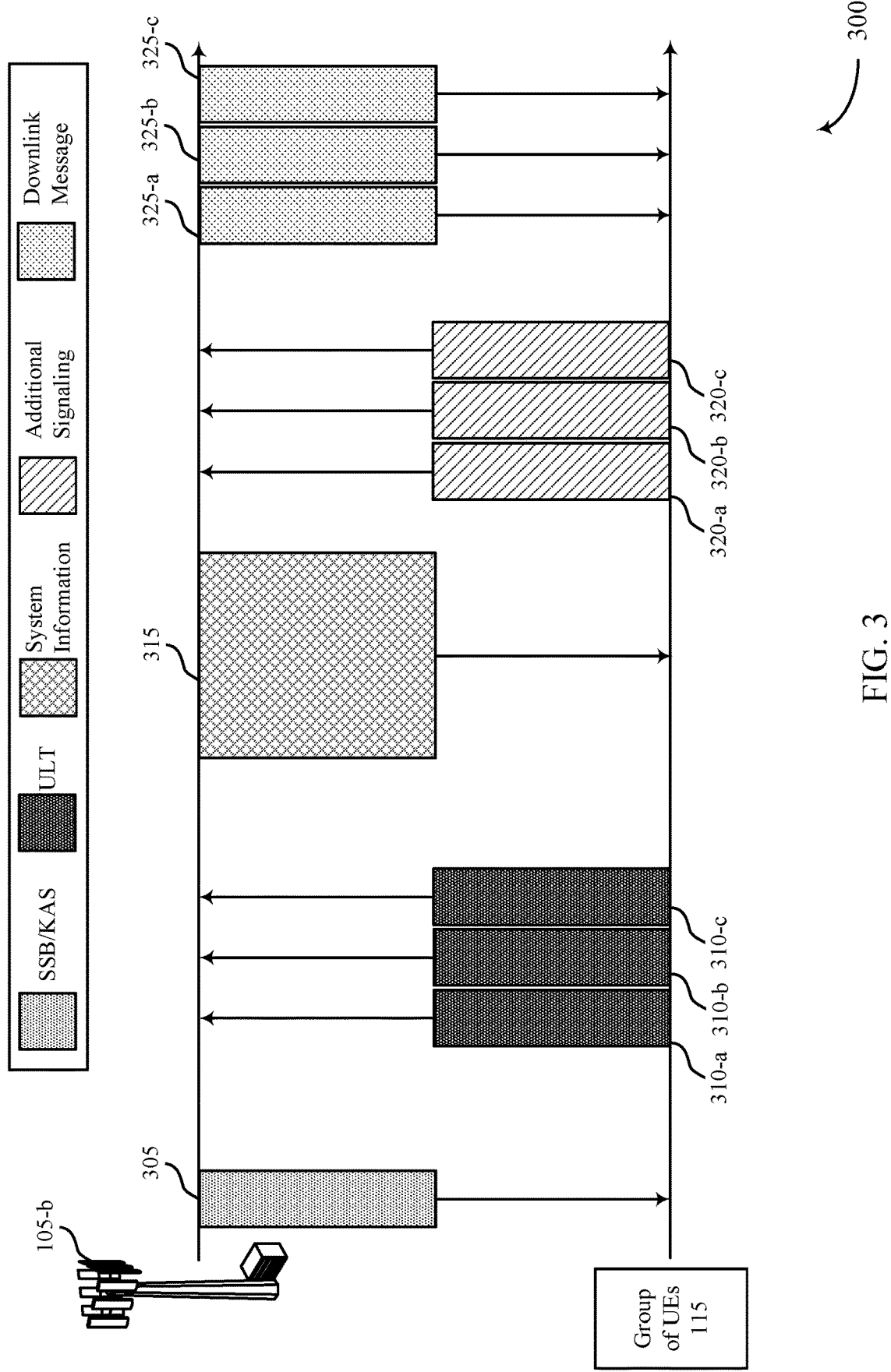

FIG. 3 illustrates an example of a wireless communications system 300 that supports communicating timing information via system information in accordance with one or more aspects of the present disclosure. The wireless communications system 300 may implement, or be implemented by, aspects of the wireless communications system 100 and the wireless communications system 200. For example, the wireless communications system 300 may include a network entity 105-*b* and a group of one or more UEs 115, which may be examples of corresponding devices described herein with reference to FIGS. 1 and 2. The group of UEs 115 may include one or multiple UEs 115.

In some implementations, the network entity 105-*b* may transmit initial signaling 305 (e.g., an SSB or a KAS) to the group of UEs 115. In response, each UE 115 of the group of UEs 115 may determine to transmit a ULT 310 to the network entity 105-*b*. For example, each UE 115 of the group may transmit a respective common ULT 310 (e.g., via a RACH). That is, each UE 115 of the group of UEs 115 may transmit a respective common ULT 310 (e.g., a ULT 310-*a*, a ULT 310-*b*, and a ULT 310-*c*) according to a common ULT format that may be shared among the group of UEs 115. Each common ULT 310 may include a request to transmit system information 315 (e.g., an SSB, MSI, or a SIB) to a respective UE 115 of the group of UEs 115.

In response to the common ULT 310, the network entity 105-*b* may transmit system information 315 (e.g., an SSB, MSI, or a SIB), which may include one or more uplink TA commands that may be shared by the group of UEs 115 (e.g., shared by multiple UEs 115). In some cases, the shared (e.g., common) TA command may be based on the TA associated with (e.g., used for) a smallest RTD of the group of UEs 115.

That is, each UE 115 of the group of UEs 115 may have different RTD times (e.g., time in which a message is sent and a response is received) and the shared TA command may be based on the TA associated with the smallest RTD (e.g., for one of the UEs 115 of the group). Thus, in cases where each UE 115 of the group of UEs 115 has different RTD times, the shared common TA command may be based on the smallest RTD of all the RTDs for the group of UEs 115 (e.g., the RTD that takes the least amount of time). Thus, each UE 115 of the group of UEs 115 may communicate (e.g., transmit uplink messages) with the network entity 105-*b* according to a timing associated with the shared TA command received via system information 315.

Implementation of a shared TA command may reduce a common delay (e.g., for reception at network entity 105-*b*) that is shared by UEs 115 of the group. The shared TA command may support further communications with the network entity 105-*b*, for example, if the difference in RTDs (e.g., the spread) between UEs 115 of the group is within a CP length. In such cases, network entity 105-*b* may apply a respective closed loop TA for each UE 115 of the group (e.g., in further communications) to refine the shared TA command.

In some examples, the network entity 105-*b* may transmit, via system information 315, a request for one or more UEs 115 of the group to transmit additional signaling 320 (e.g., a follow up ULT or PRACH), for example, in addition to the shared TA command. For example, in some cases, the difference in RTD between each UE 115 of the group of UEs 115 may be greater than a timing threshold (e.g., two or more UEs 115 may not be within a CP of each other), such that the shared common TA command may not be sufficient to align the timing of transmissions from the UEs 115 at the network entity 105-*b*. In such cases, the network entity 105-*b* may transmit the request for additional signaling 320 to identify each UE 115, and the network entity 105-*b* may use the additional signaling 320 to further refine the TA commands for each UE 115 (e.g., to determine a respective TA for each UE 115).

For example, the system information 315 may include a field or information element that may indicate whether one or more UEs 115 of the group are to transmit the additional signaling 320. In some cases, the field or information element may indicate for all UEs 115 of the group to transmit the additional signaling 320. In some cases, the field or information element may indicate for one or more UEs 115 of the group to transmit the additional signaling 320 (e.g., identifying the one or more UEs 115 via a UE ID or other identification technique).

In response, each UE 115 of the group of UEs 115 may transmit the additional signaling 320 that includes respective UE identification parameters (e.g., UE IDs). Each UE 115 may transmit the additional signaling according to the timing associated with the shared TA command. In some cases, the additional signaling may be separate ULT messages from each UE 115. In some other cases, the additional signaling may be multiple PRACHs (e.g., a PRACH 320-*a*, a PRACH 320-*b*, and a PRACH 320-*c*), or any other sequence or signaling identifying each UE 115. In such cases, each UE 115 may transmit the additional signaling 320 with a smaller dimension (e.g., a smaller CP or as a reduced sequence), thereby reducing the CP, guard, and zero-correlation-zone requirements for the additional signaling 320, for example, because a portion of the delays in communications may be accounted for in the shared TA command.

Based on the received additional signaling 320 identifying each UE 115 of the group of UEs 115, the network entity 105-*b* may determine a respective TA command for each UE 115. The network entity 105-*b* may transmit the respective TA command to each UE 115 that transmitted the additional signaling 320 (e.g., each UE 115 of the group of UEs 115) via unicast signaling. That is, the network entity 105-*b* may transmit the TA commands for each UE 115 separately in downlink messages 325 (e.g., downlink message 325-*a*, downlink message 325-*b*, and downlink message 325-*c*). Thus, each UE 115 (e.g., of the group of UEs 115) may communicate with the network entity 105-*b* according to a timing associated with the TA commands received via the unicast signaling.

Figure 4:
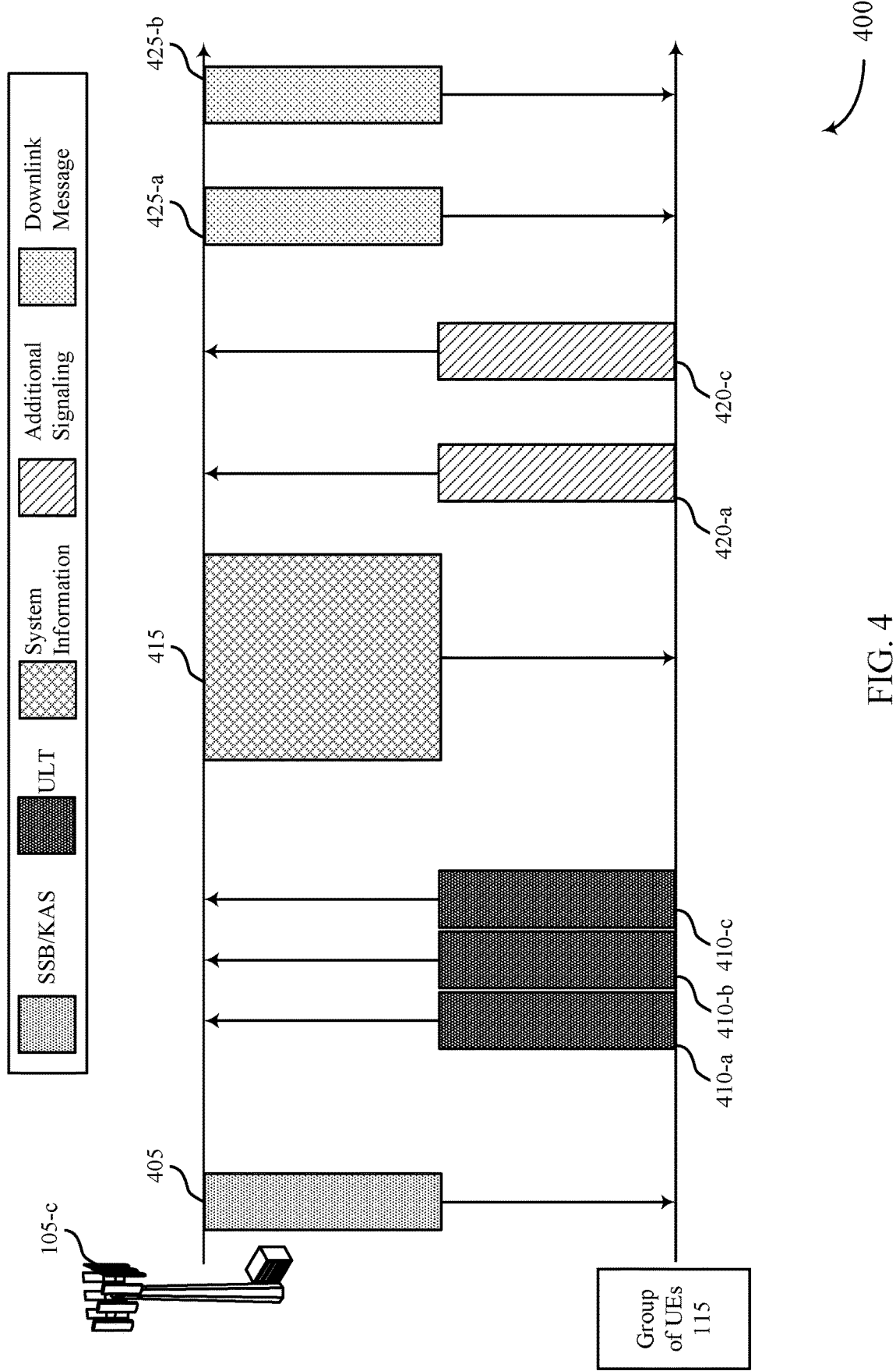

FIG. 4 illustrates an example of a wireless communications system 400 that supports communicating timing information via system information in accordance with one or more aspects of the present disclosure. The wireless communications system 400 may implement, or be implemented by, aspects of the wireless communications system 100 or the wireless communications system 200. For example, the wireless communications system 400 may include a network entity 105-*c* and a group of one or more UEs 115, which may be examples of corresponding devices described herein with reference to FIGS. 1-3. The group of UEs 115 may include one or multiple UEs 115.

In some implementations, the network entity 105-*c* may transmit initial signaling 405 (e.g., an SSB or KAS) to the group of UEs 115. In response, each UE 115 of the group of UEs 115 may determine to transmit a respective ULT 410 (e.g., ULT 410-*a*, ULT 410-*b*, and ULT 410-*c*) requesting system information 415 (e.g., SSB, MSI, or SIB). Each UE 115 of the group of UEs 115 may transmit the respective ULT 410 according to a respective (e.g., different) ULT format. In some cases, each UE 115 may include an indication of a UE ID, such as a RAPID, in the respective ULT 410.

The network entity 105-*c* may receive each ULT 410 (e.g., ULT 410-*a*, ULT 410-*b*, and ULT 410-*c*) and transmit system information 415 to the group of UEs 115 in response to the ULTs 410. The system information 415 may include a respective TA command for each UE 115. For example, each TA command may be associated with (e.g., affixed to) an ID for each UE 115 of the group of UEs 115 that transmitted a ULT 410. That is, the network entity 105-*c* may transmit system information 415 that may include a mapping of respective UE IDs to TA commands (e.g., multiple {RAPID, TA} pairs). For example, the system information 415 may include a field or information element that may indicate the TA commands and the respective UE IDs. Thus, each UE 115 that transmitted a ULT 410 may apply the corresponding TA for communications with the network entity 105-*a* based on the mapping of the UE ID to TA received in the system information 415.

In some cases, the network entity 105-*c* may transmit a request for additional signaling 420 (e.g., follow up ULT message or PRACH) to resolve one or more collisions. For example, the network entity 105-*c* may receive a ULT 410-*a* from a first UE 115 and a ULT 410-*c* from a second UE 115, where the ULT 410-*a* and the ULT 410-*b* may include a same UE ID (e.g., same RAPID), but may be associated with different TA commands (e.g., based on different RTDs). Thus, the network entity 105-*c* may request additional signaling 420 from the first and second UE 115 (e.g., the colliding UEs 115).

For example, the system information 415 may include a field or information element that may indicate whether one or more UEs 115 of the group are to transmit the additional signaling 420. In some cases, the field or information element may be a same field or information element as used to indicate the TA commands for the UEs 115 of the group. For example, the field indicating the TA command may be set to a different value for UEs 115 that are to transmit the additional signaling 420. In some cases, an additional field or flag (e.g., a different data structure) may be set for UEs 115 that are to transmit the additional signaling 420 (e.g., in association with the TA command). In some cases, the field or information element may indicate for all UEs 115 of the group to transmit the additional signaling 420. In some cases, the field or information element may indicate for one or more UEs 115 of the group to transmit the additional signaling 420 (e.g., identifying the one or more UEs 115 via a UE ID or other identification technique).

In such cases, the first UE 115 and the second UE 115 may select a new sequence for transmitting the additional signaling 420, such as a new UE ID (e.g., new RAPID) and a randomized backoff value. The first UE 115 may transmit additional signaling 420-a, and the second UE 115 may transmit additional signaling 420-c. In some cases, the first and second UE 115 may transmit the additional signaling 420 as ULTs 410 that include separate UE IDs, among other parameters. In some cases, the additional signaling 420 may be transmitted as a PRACH or other sequence or modulated signal indicating a UE identity. In response to receiving the additional signaling 420, the network entity 105-c may transmit a downlink message 425-a to the first UE 115 and a downlink message 425-b to the second UE 115. The downlink message 425-a and the downlink message 425-b may include TA commands for the first UE 115 and the second UE 115, respectively, which may support communications with the network entity 105-c according to a timing associated with respective TA commands for different UEs 115.

Figure 5:
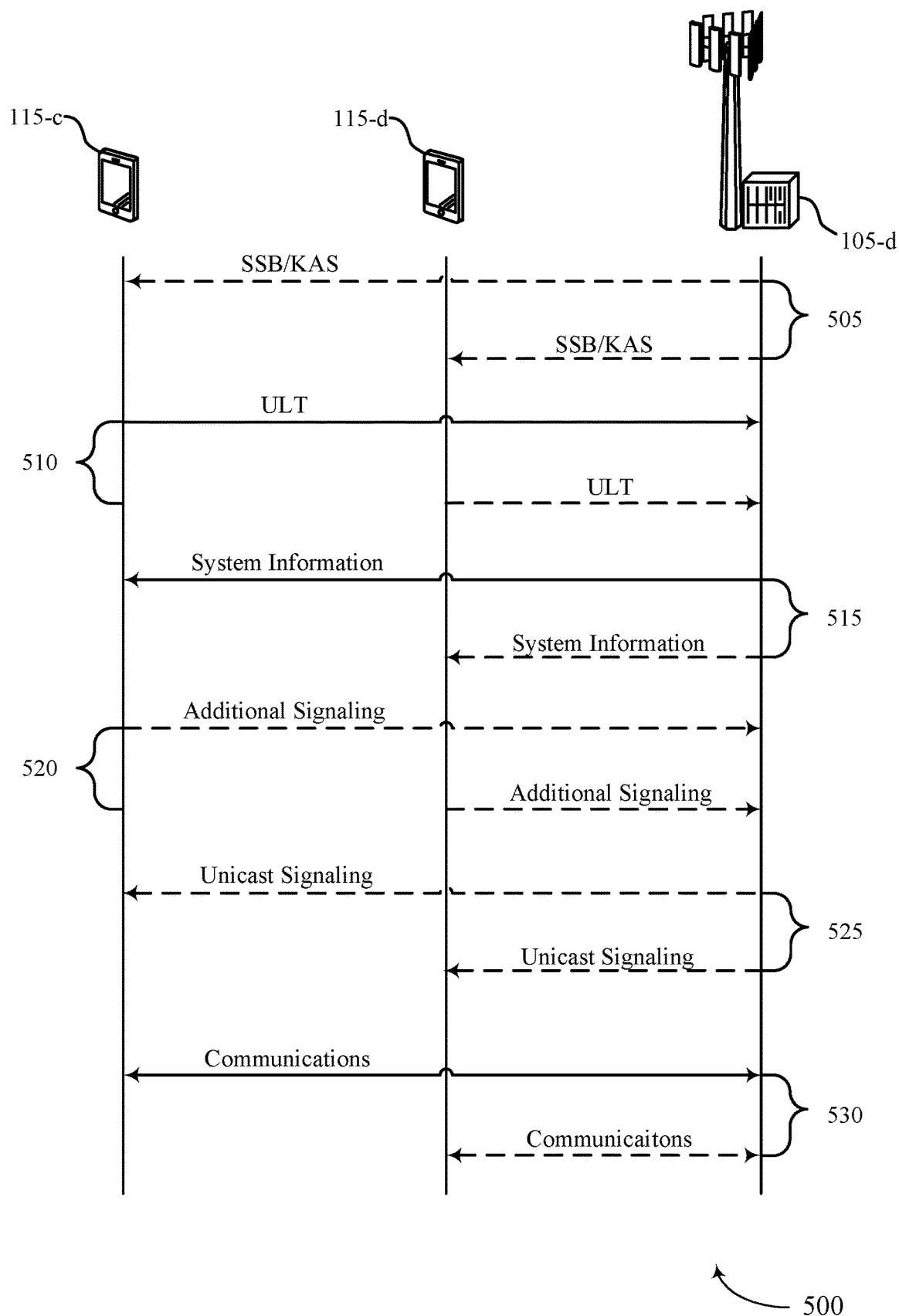
FIG. 5 illustrates an example of a process flow that supports communicating timing information via system information in accordance with one or more aspects of the present disclosure.

FIG. 5 illustrates an example of a process flow 500 that supports communicating timing information via system information in accordance with one or more aspects of the present disclosure. The process flow 500 may implement, or be implemented by, aspects of the wireless communications system 100, the wireless communications system 200, the wireless communications system 300, the wireless communications system 400, or any combination thereof. For example, the process flow 500 may be implemented by a network entity 105-d, a UE 115-c, and a UE 115-d. In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the network entity 105-d may output, to the UE 115-c and the UE 115-d, initial signaling such as an a SSB, a KAS, or both, that is associated with the network entity 105-d.

At 510, the UE 115-c and, in some cases, the UE 115-d may transmit a ULT message based on receiving the SSB, KAS, or both at 505. The ULT message may indicate a request to transmit a system information message that includes uplink timing information for the UE 115-a or the UE 115-b, respectively. In some examples, the request for system information may be transmitted via a RACH, such as a PRACH. The system information message may include an SSB, a SIB, MSI, or any combination thereof. In some examples, the UE 115-c and the UE 115-d may transmit the ULT message according to a same format. In some other examples, the UE 115-c and the UE 115-d may transmit the ULT message according to a different format, where the different format may be distinguished based on including an ID of the UE 115-c in a first ULT message transmitted by the UE 115-c and an ID of the UE 115-d in a second ULT message transmitted by the UE 115-d.

At 515, the network entity 105-d may output a system information message in response to obtaining the ULT message(s). The system information may include a TA command applicable to one or more UEs 115 (e.g., at least UE 115-c). In the case where the ULT messages from the UE 115-c and the UE 115-d have the same format, the system information message may indicate a TA command that is applicable to both the UE 115-c and the UE 115-d (e.g., a common or shared TA command). In such cases, the TA command may be an example of a shared TA command described with reference to FIG. 3 and may, for example, be based on a smallest RTD of either the UE 115-c and the UE 115-d. In the case where the ULT messages from the UE 115-c and the UE 115-d have a different format, the system information may indicate a set of TA commands each applicable to the UE 115-c and the UE 115-d, respectively. In such cases, the TA commands for the UE 115-c and the UE 115-d may be distinguished based on associating the respective TA commands with the respective UE IDs of the UE 115-c and the UE 115-d.

In some examples, at 515, the network entity 105-d may output, via the system information, a request for the UE 115-c and the UE 115-d to transmit additional signaling to identify each UE 115. In such examples, the system information message may indicate for the UE 115-c and the UE 115-d to transmit the additional signaling identifying the UE 115-c and the UE 115-d based on a difference in timing between the request for transmission of the system information message from the UE 115-c and the request for transmission of the system information message from the UE 115-d (e.g., as described with reference to FIG. 3). Additionally, or alternatively, the system information message may indicate for the UE 115-c and the UE 115-d to transmit the additional signaling identifying each UE 115 based on a collision between the request for transmission of the system information message from the UE 115-c and the request for transmission of the system information message from the UE 115-d (e.g., as described with reference to FIG. 4).

At 520, in some examples, the UE 115-c and the UE 115-d may transmit to the network entity 105-d and in accordance with the TA commands received in the system information at 515, the additional signaling to further identify the UE 115-c and the UE 115-d (e.g., based on receiving the request for additional signaling at 515). At 525, network entity 105-d may output, to the UE 115-c and the UE 115-d, unicast signaling indicating respective TA command for each UE 115. At 530, the UE 115-c and the UE 115-d may communicate with the network entity 105-d according to the respective TA command received via the system information at 515, the unicast signaling at 525, or both.

Figure 6:
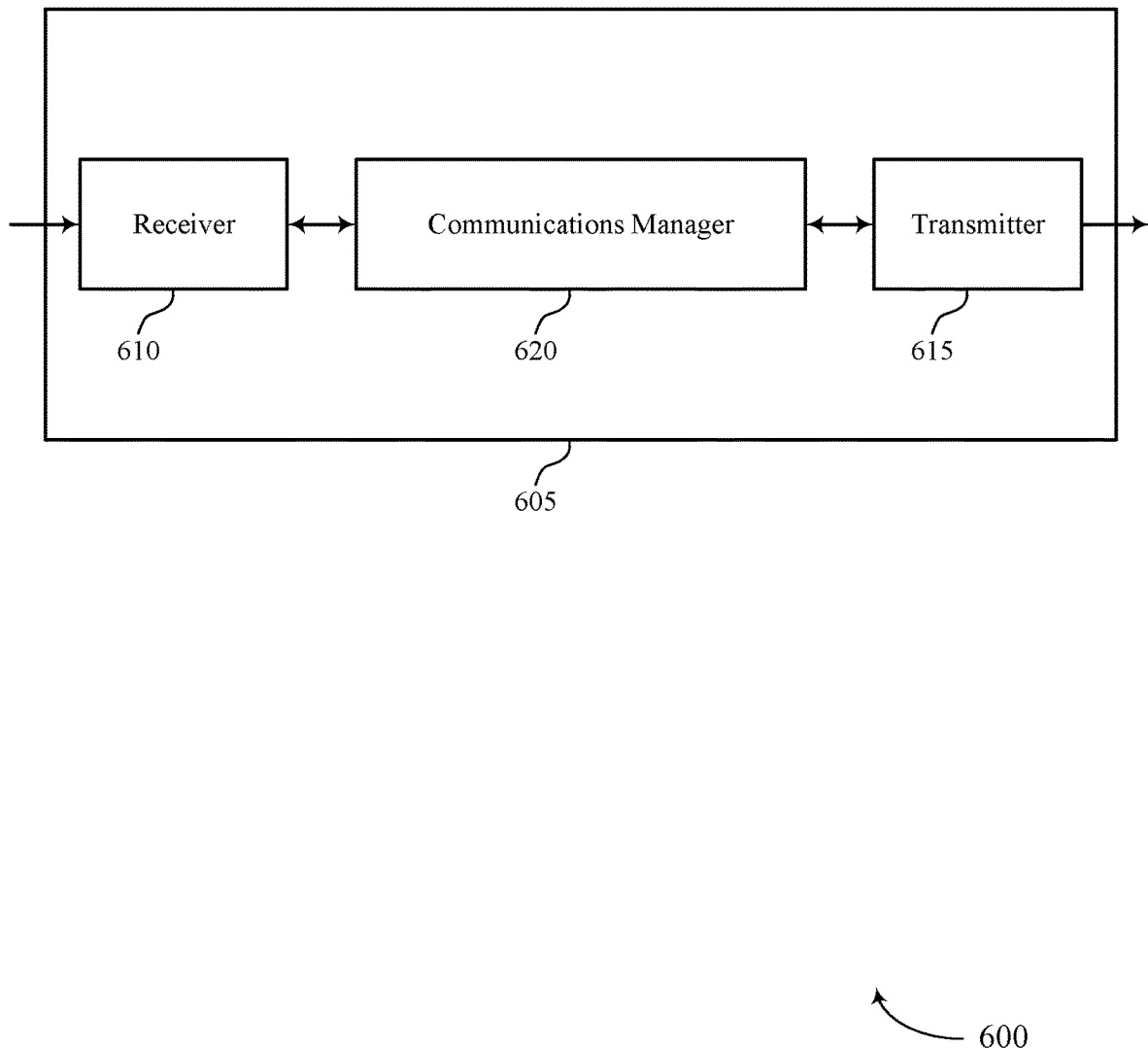
FIGS. 6 and 7 show block diagrams of devices that support communicating timing information via system information in accordance with one or more aspects of the present disclosure.

FIG. 6 shows a block diagram 600 of a device 605 that supports communicating timing information via system information in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to communicating timing information via system information). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to communicating timing information via system information). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of communicating timing information via system information as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for transmitting, to a network entity, a ULT message that indicates a request for the network entity to transmit a system information message that includes uplink timing information for the UE. The communications manager 620 may be configured as or otherwise support a means for receiving, from the network entity, the system information message including a TA command applicable to at least the UE at least in part in response to the ULT message. The communications manager 620 may be configured as or otherwise support a means for communicating with the network entity according to a timing that is based on the TA command received via the system information message.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for including a TA command in system information in response to a ULT message, which may support more efficient utilization of communication resources.

Figure 7:
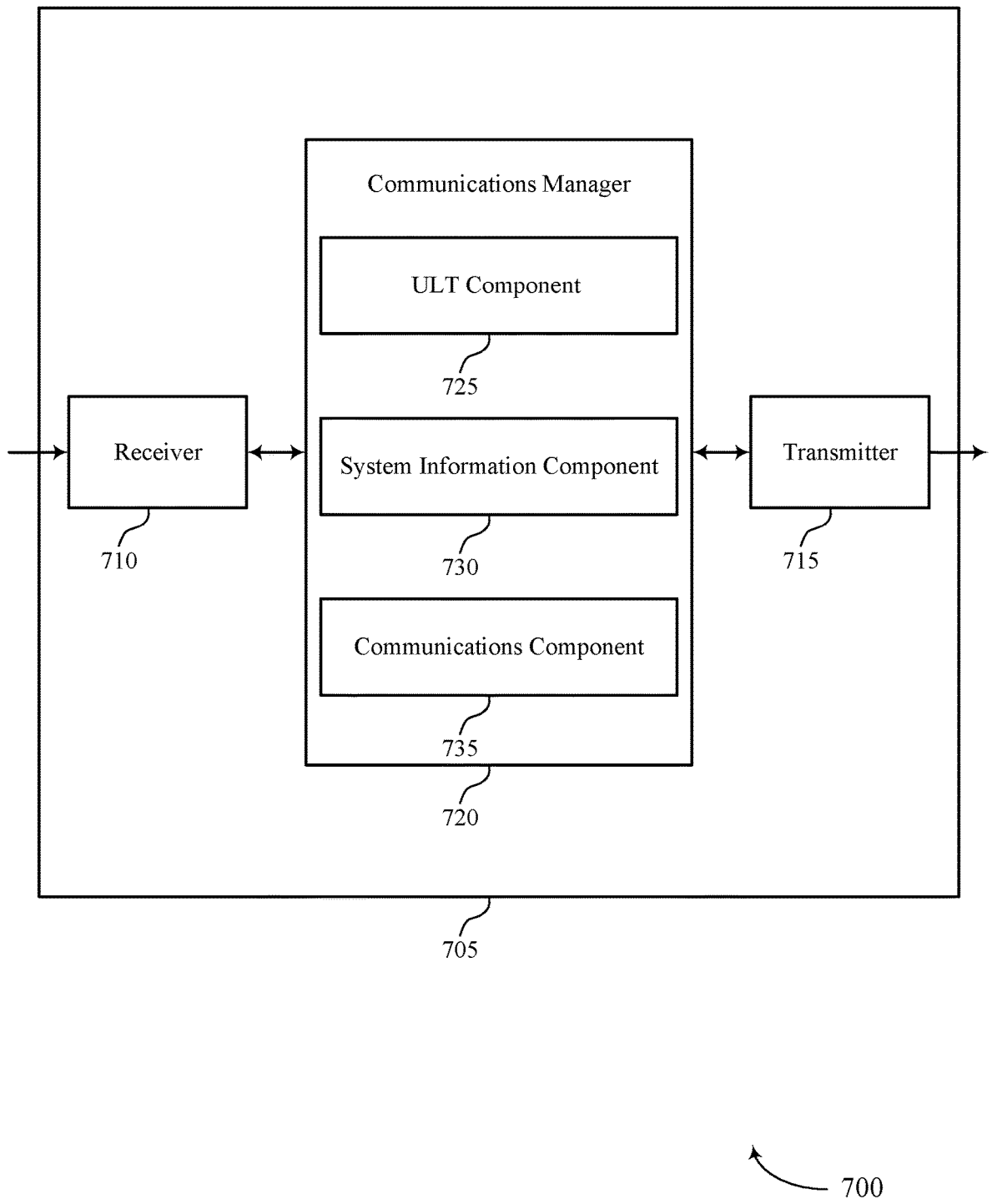

FIG. 7 shows a block diagram 700 of a device 705 that supports communicating timing information via system information in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to communicating timing information via system information). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to communicating timing information via system information). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of communicating timing information via system information as described herein. For example, the communications manager 720 may include a ULT component 725, a system information component 730, a communications component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The ULT component 725 may be configured as or otherwise support a means for transmitting, to a network entity, a ULT message that indicates a request for the network entity to transmit a system information message that includes uplink timing information for the UE. The system information component 730 may be configured as or otherwise support a means for receiving, from the network entity, the system information message including a TA command applicable to at least the UE at least in part in response to the ULT message. The communications component 735 may be configured as or otherwise support a means for communicating with the network entity according to a timing that is based on the TA command received via the system information message.

Figure 8:
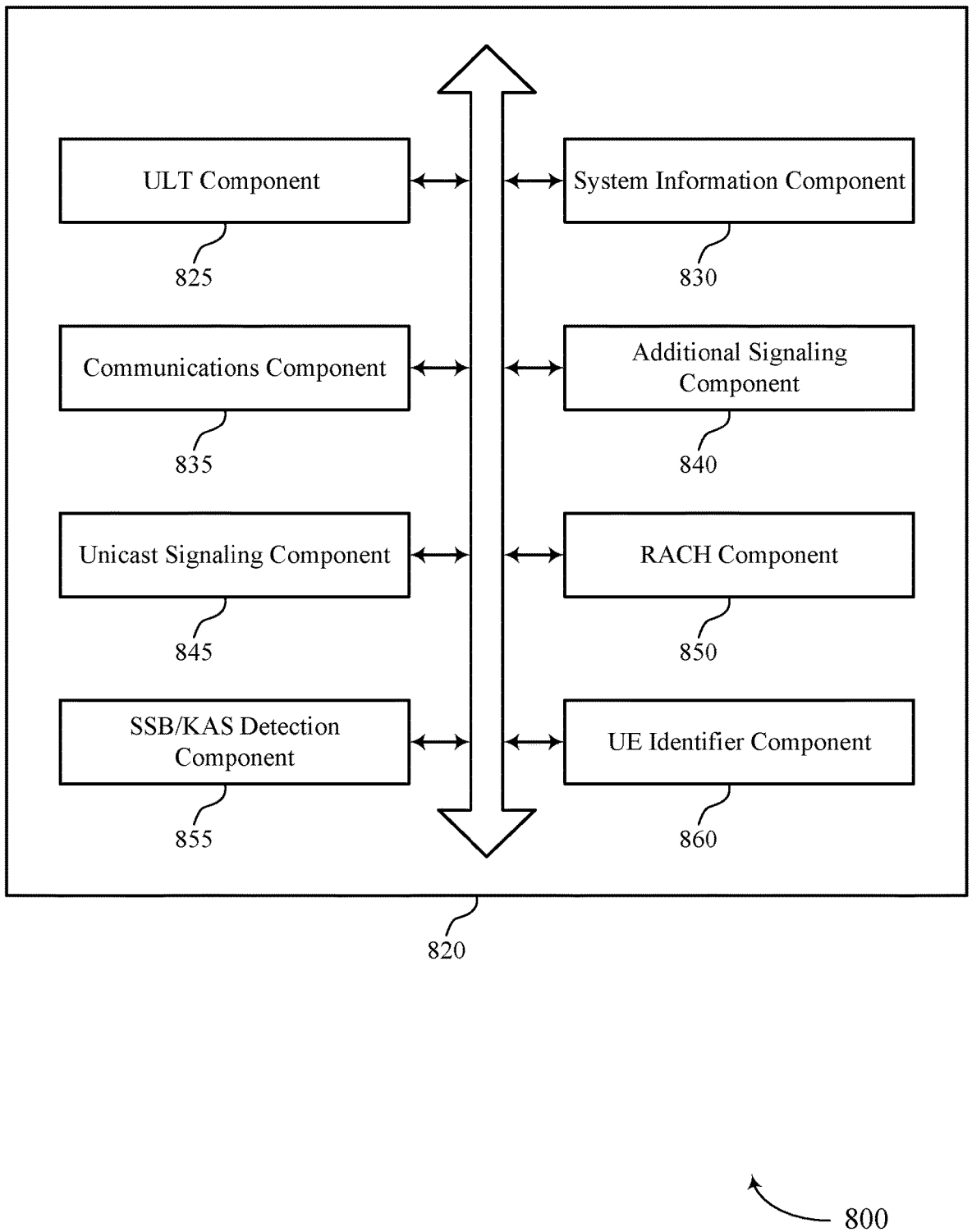
FIG. 8 shows a block diagram of a communications manager that supports communicating timing information via system information in accordance with one or more aspects of the present disclosure.

FIG. 8 shows a block diagram 800 of a communications manager 820 that supports communicating timing information via system information in accordance with one or more aspects of the present disclosure. The communications manager 820 may be an example of aspects of a communications manager 620, a communications manager 720, or both, as described herein. The communications manager 820, or various components thereof, may be an example of means for performing various aspects of communicating timing information via system information as described herein. For example, the communications manager 820 may include a ULT component 825, a system information component 830, a communications component 835, an additional signaling component 840, a unicast signaling component 845, a RACH component 850, an SSB/KAS detection component 855, a UE ID component 860, or any combination thereof. Each of these components may communicate, directly or indirectly, with one another (e.g., via one or more buses).

The communications manager 820 may support wireless communication at a UE in accordance with examples as disclosed herein. The ULT component 825 may be configured as or otherwise support a means for transmitting, to a network entity, a ULT message that indicates a request for the network entity to transmit a system information message that includes uplink timing information for the UE. The system information component 830 may be configured as or otherwise support a means for receiving, from the network entity, the system information message including a TA command applicable to at least the UE at least in part in response to the ULT message. The communications component 835 may be configured as or otherwise support a means for communicating with the network entity according to a timing that is based on the TA command received via the system information message.

In some examples, to support receiving the system information message, the system information component 830 may be configured as or otherwise support a means for receiving the system information message indicating the TA command is applicable to a group of UEs including the UE and one or more additional UEs.

In some examples, the one or more additional UEs have each requested the system information message via respective ULT messages, the respective ULT messages and the ULT message having a same format.

In some examples, the TA command is based on a smallest round trip delay associated with UEs of the group of UEs.

In some examples, to support receiving the system information message, the system information component 830 may be configured as or otherwise support a means for receiving the system information message indicating a set of one or more additional TA commands each applicable to a respective additional UE of one or more additional UEs.

In some examples, the one or more additional UEs have each requested the system information message via respective ULT messages, the respective ULT messages and the ULT message having different formats.

In some examples, the UE ID component 860 may be configured as or otherwise support a means for transmitting the ULT message indicating an ID of the UE in association with the request to transmit the system information message. In some examples, the system information component 830 may be configured as or otherwise support a means for receiving the system information message indicating that the TA command is associated with the ID of the UE.

In some examples, the system information component 830 may be configured as or otherwise support a means for receiving the system information message indicating for the UE to transmit additional signaling identifying the UE. In some examples, the additional signaling component 840 may be configured as or otherwise support a means for transmitting, to the network entity and in accordance with the timing that is based on the TA command, the additional signaling identifying the UE. In some examples, the unicast signaling component 845 may be configured as or otherwise support a means for receiving, from the network entity, unicast signaling including a second TA command at least in part in response to the additional signaling identifying the UE. In some examples, the communications component 835 may be configured as or otherwise support a means for communicating with the network entity according to a second timing that is based on the second TA command.

In some examples, the system information message indicates for the UE to transmit the additional signaling identifying the UE based on a difference in timing between the request for transmission of the system information message from the UE and an additional request for transmission of the system information message from an additional UE.

In some examples, the system information message indicates for the UE to transmit the additional signaling identifying the UE based on a collision between the request for transmission of the system information message from the UE and an additional request for transmission of the system information message from an additional UE.

In some examples, the system information message includes a SSB, a SIB, MSI, or any combination thereof.

In some examples, to support transmitting the request to transmit the system information message, the RACH component 850 may be configured as or otherwise support a means for transmitting the request via a RACH.

In some examples, to support transmitting the request to transmit the system information message, the SSB/KAS detection component 855 may be configured as or otherwise support a means for transmitting the request based on detecting a SSB associated with the network entity, a KAS associated with the network entity, or both.

Figure 9:
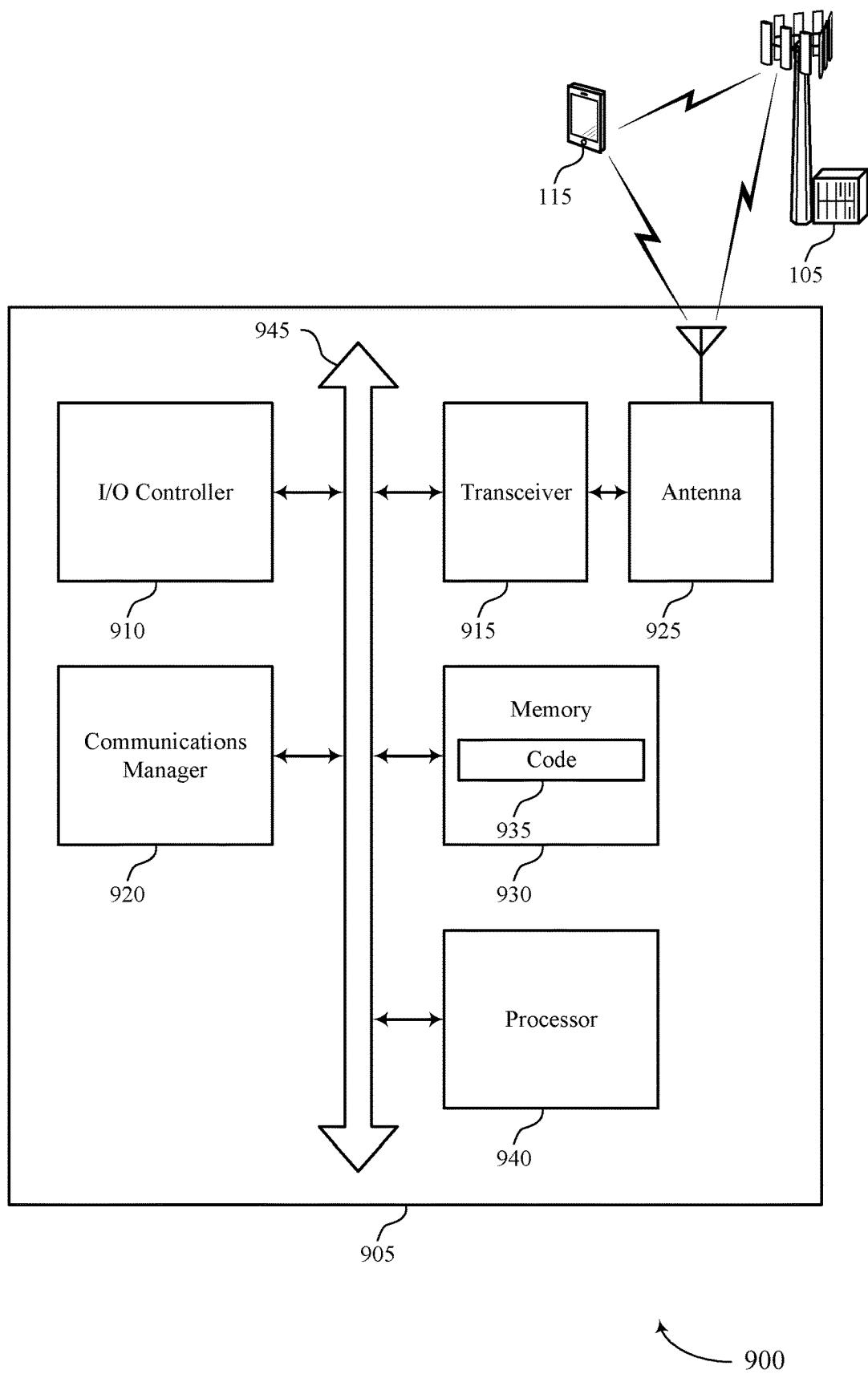
FIG. 9 shows a diagram of a system including a device that supports communicating timing information via system information in accordance with one or more aspects of the present disclosure.

FIG. 9 shows a diagram of a system 900 including a device 905 that supports communicating timing information via system information in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting communicating timing information via system information). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, to a network entity, a ULT message that indicates a request for the network entity to transmit a system information message that includes uplink timing information for the UE. The communications manager 920 may be configured as or otherwise support a means for receiving, from the network entity, the system information message including a TA command applicable to at least the UE at least in part in response to the ULT message. The communications manager 920 may be configured as or otherwise support a means for communicating with the network entity according to a timing that is based on the TA command received via the system information message.

By including or configuring the communications manager 920 in accordance with examples as described herein, the device 905 may support techniques for including a TA command in system information in response to a ULT message, which may support improved communication reliability, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of communicating timing information via system information as described herein, or the processor 940 and the memory 930 may be otherwise configured to perform or support such operations.

Figure 10:
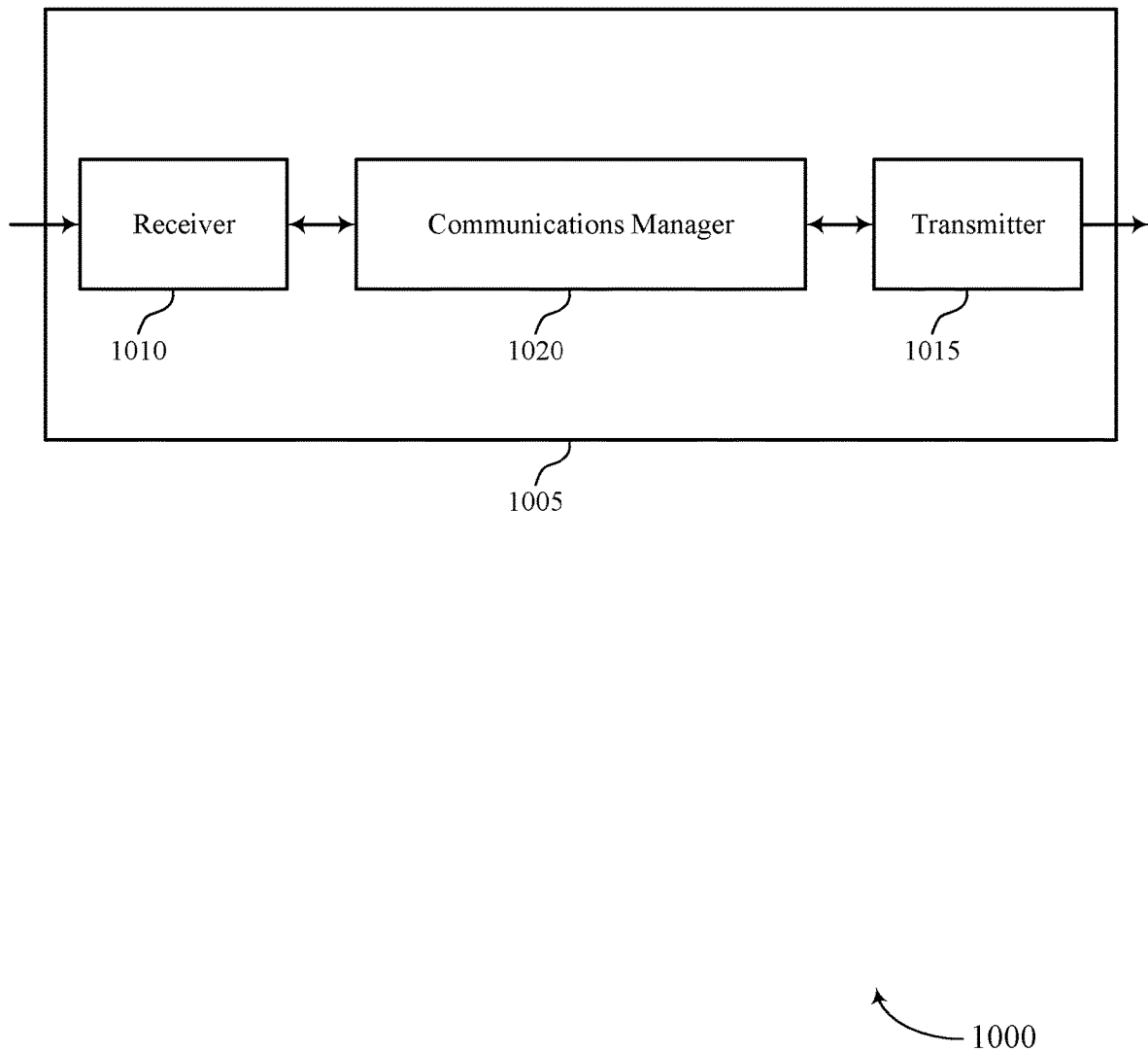
FIGS. 10 and 11 show block diagrams of devices that support communicating timing information via system information in accordance with one or more aspects of the present disclosure.

FIG. 10 shows a block diagram 1000 of a device 1005 that supports communicating timing information via system information in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of communicating timing information via system information as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for obtaining a ULT message that indicates a request for the network entity to transmit a system information message that includes timing information for a UE. The communications manager 1020 may be configured as or otherwise support a means for outputting the system information message including a TA command applicable to at least the UE at least in part in response to the request for transmission of the system information message. The communications manager 1020 may be configured as or otherwise support a means for communicating with the UE according to a timing that is based on the TA command received via the system information message.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for including a TA command in system information in response to a ULT message, which may support more efficient utilization of communication resources.

Figure 11:
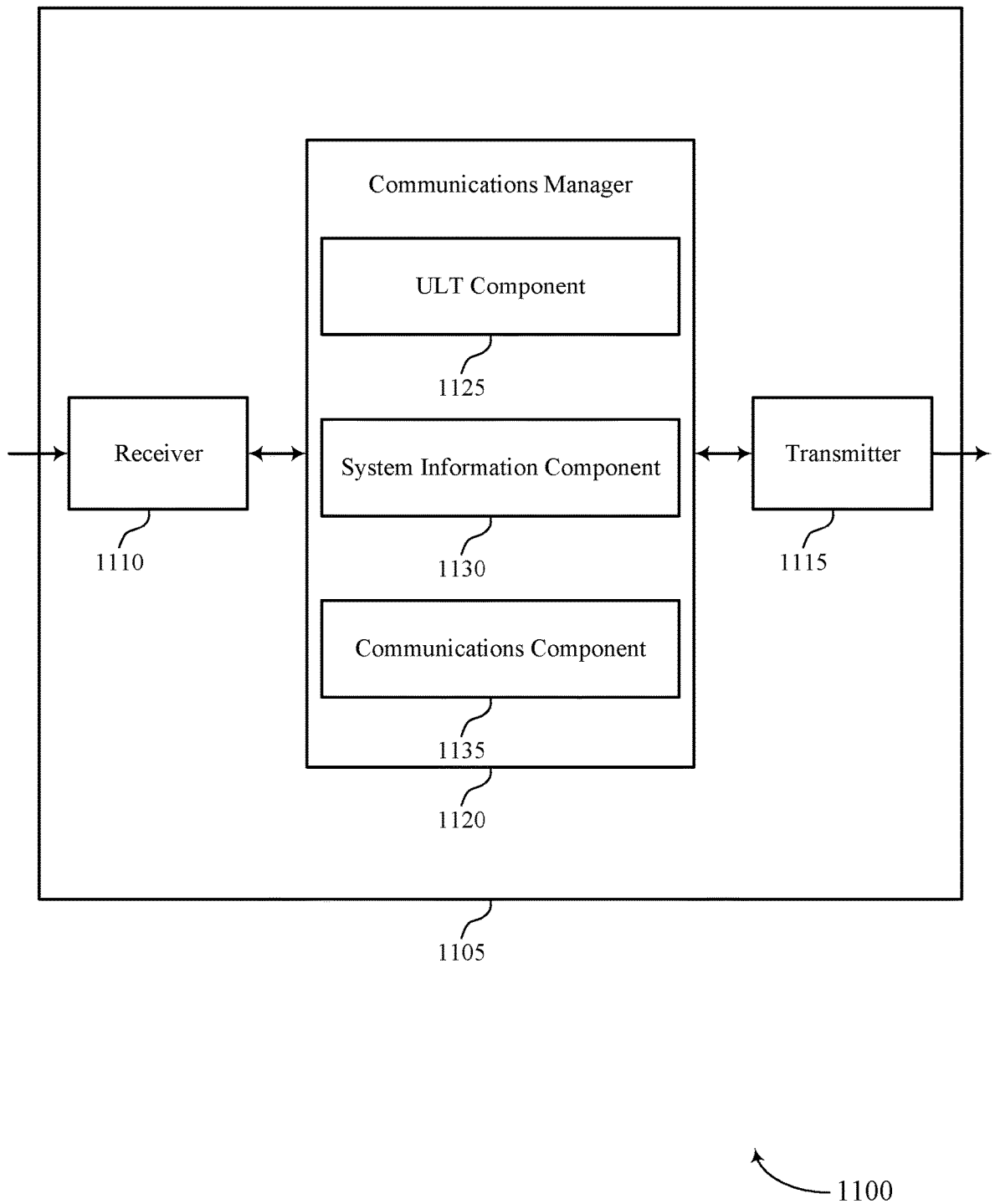

FIG. 11 shows a block diagram 1100 of a device 1105 that supports communicating timing information via system information in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of communicating timing information via system information as described herein. For example, the communications manager 1120 may include a ULT component 1125, a system information component 1130, a communications component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The ULT component 1125 may be configured as or otherwise support a means for obtaining a ULT message that indicates a request for the network entity to transmit a system information message that includes timing information for a UE. The system information component 1130 may be configured as or otherwise support a means for outputting the system information message including a TA command applicable to at least the UE at least in part in response to the request for transmission of the system information message. The communications component 1135 may be configured as or otherwise support a means for communicating with the UE according to a timing that is based on the TA command received via the system information message.

Figure 12:
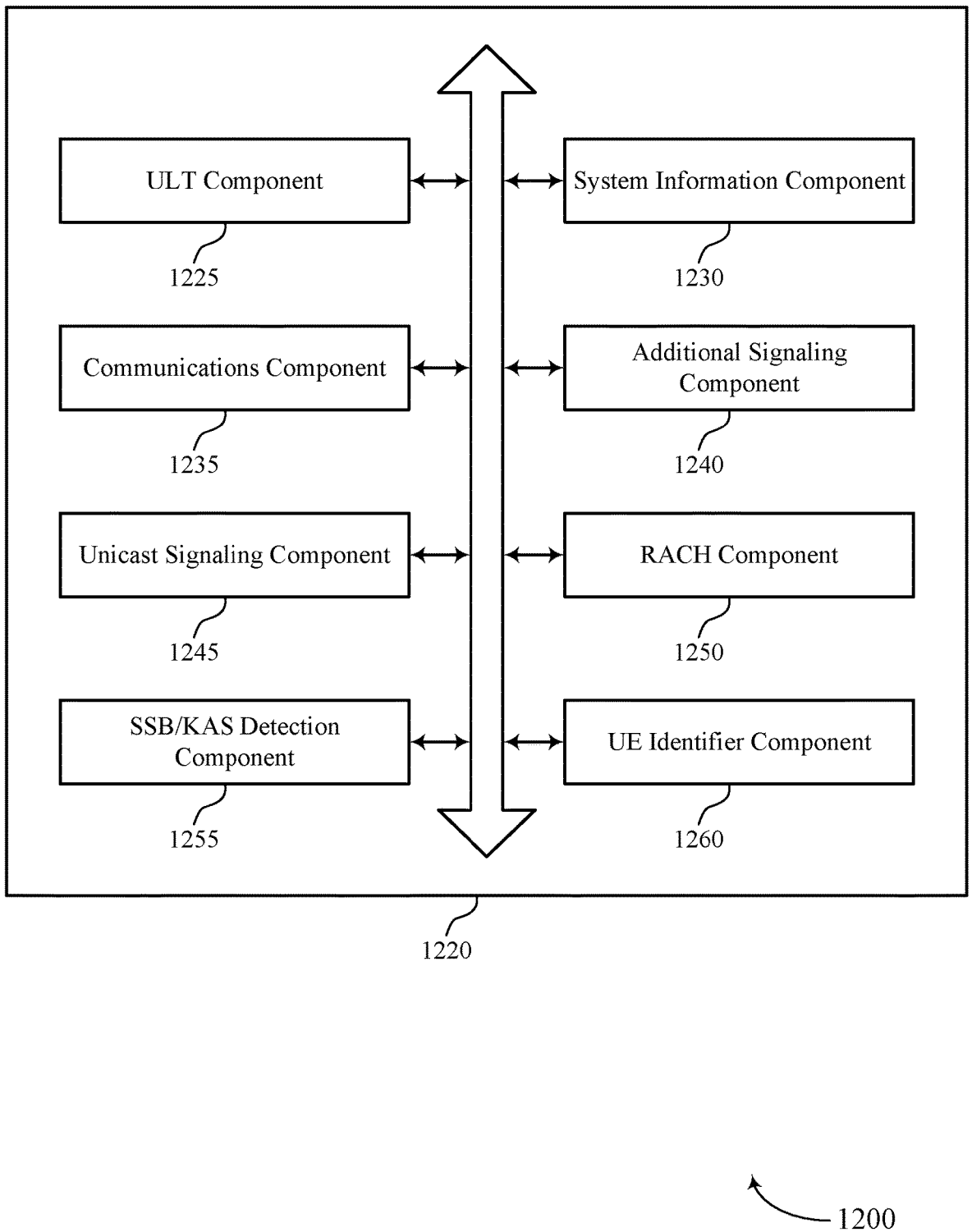
FIG. 12 shows a block diagram of a communications manager that supports communicating timing information via system information in accordance with one or more aspects of the present disclosure.

FIG. 12 shows a block diagram 1200 of a communications manager 1220 that supports communicating timing information via system information in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of communicating timing information via system information as described herein. For example, the communications manager 1220 may include a ULT component 1225, a system information component 1230, a communications component 1235, an additional signaling component 1240, a unicast signaling component 1245, a RACH component 1250, an SSB/KAS detection component 1255, a UE ID component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The ULT component 1225 may be configured as or otherwise support a means for obtaining a ULT message that indicates a request for the network entity to transmit a system information message that includes timing information for a UE. The system information component 1230 may be configured as or otherwise support a means for outputting the system information message including a TA command applicable to at least the UE at least in part in response to the request for transmission of the system information message. The communications component 1235 may be configured as or otherwise support a means for communicating with the UE according to a timing that is based on the TA command received via the system information message.

In some examples, to support outputting the system information message, the system information component 1230 may be configured as or otherwise support a means for outputting the system information message indicating the TA command is applicable to a group of UEs including the UE and one or more additional UEs.

In some examples, the one or more additional UEs have each requested the system information message via respective ULT messages, the respective ULT messages and the ULT message having a same format.

In some examples, the TA command is based on a smallest round trip delay associated with UEs of the group of UEs.

In some examples, to support outputting the system information message, the system information component 1230 may be configured as or otherwise support a means for outputting the system information message indicating a set of one or more additional TA commands each applicable to a respective additional UE of one or more additional UEs.

In some examples, the one or more additional UEs have each requested the system information message via respective ULT messages, the respective ULT messages and the ULT message having different formats.

In some examples, the UE ID component 1260 may be configured as or otherwise support a means for obtaining the ULT message indicating an ID of the UE in association with the request to transmit the system information message. In some examples, the system information component 1230 may be configured as or otherwise support a means for outputting the system information message indicating that the TA command is associated with the ID of the UE.

In some examples, the system information component 1230 may be configured as or otherwise support a means for outputting the system information message indicating for the UE to transmit additional signaling identifying the UE. In some examples, the additional signaling component 1240 may be configured as or otherwise support a means for obtaining, in accordance with the timing that is based on the TA command, the additional signaling identifying the UE. In some examples, the unicast signaling component 1245 may be configured as or otherwise support a means for outputting unicast signaling including a second TA command at least in part in response to the additional signaling identifying the UE. In some examples, the communications component 1235 may be configured as or otherwise support a means for communicating with the UE according to a second timing that is based on the second TA command.

In some examples, the system information message indicates for the UE to transmit the additional signaling identifying the UE based on a difference in timing between the request for transmission of the system information message from the UE and an additional request for transmission of the system information message from an additional UE.

In some examples, the system information message indicates for the UE to transmit the additional signaling identifying the UE based on a collision between the request for transmission of the system information message from the UE and an additional request for transmission of the system information message from an additional UE.

In some examples, the system information message includes a SSB, a SIB, MSI, or any combination thereof.

In some examples, to support obtaining the request to transmit the system information message, the RACH component 1250 may be configured as or otherwise support a means for obtaining the request via a RACH.

In some examples, the SSB/KAS detection component 1255 may be configured as or otherwise support a means for outputting a SSB, a KAS, or both, where the ULT message indicating the request for the network entity to transmit the system information message is based on the SSB, the KAS, or both.

Figure 13:
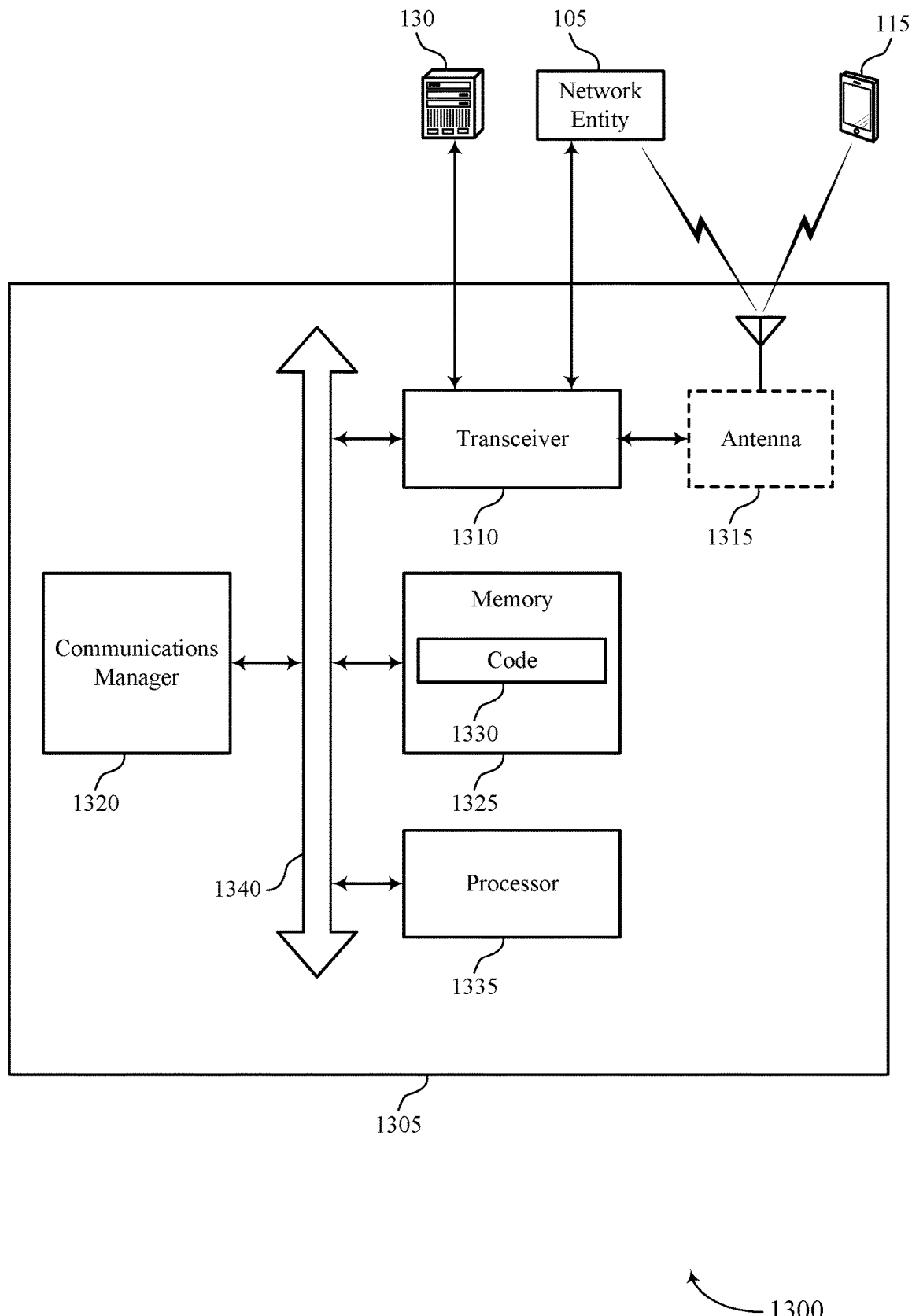
FIG. 13 shows a diagram of a system including a device that supports communicating timing information via system information in accordance with one or more aspects of the present disclosure.

FIG. 13 shows a diagram of a system 1300 including a device 1305 that supports communicating timing information via system information in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting communicating timing information via system information). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for obtaining a ULT message that indicates a request for the network entity to transmit a system information message that includes timing information for a UE. The communications manager 1320 may be configured as or otherwise support a means for outputting the system information message including a TA command applicable to at least the UE at least in part in response to the request for transmission of the system information message. The communications manager 1320 may be configured as or otherwise support a means for communicating with the UE according to a timing that is based on the TA command received via the system information message.

By including or configuring the communications manager 1320 in accordance with examples as described herein, the device 1305 may support techniques for including a TA command in system information in response to a ULT message, which may support improved communication reliability, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of communicating timing information via system information as described herein, or the processor 1335 and the memory 1325 may be otherwise configured to perform or support such operations.

Figure 14:
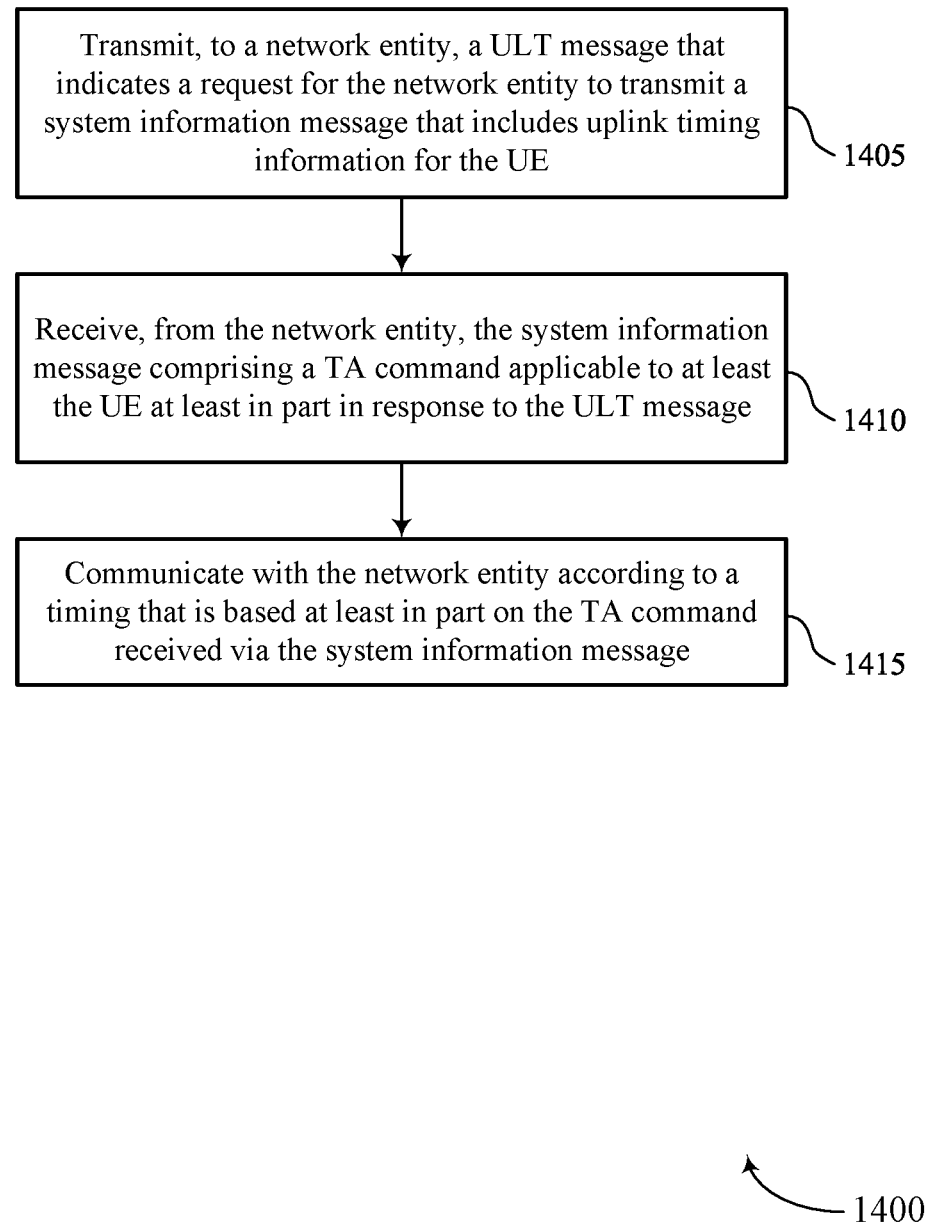
FIGS. 14 through 17 show flowcharts illustrating methods that support communicating timing information via system information in accordance with one or more aspects of the present disclosure.

FIG. 14 shows a flowchart illustrating a method 1400 that supports communicating timing information via system information in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, a ULT message that indicates a request for the network entity to transmit a system information message that includes uplink timing information for the UE. The operations of 1405 may be performed in accordance with examples as disclosed herein. In some examples, aspects of the operations of 1405 may be performed by a ULT component 825 as described with reference to FIG. 8.

At 1410, the method may include receiving, from the network entity, the system information message including a TA command applicable to at least the UE at least in part in response to the ULT message. The operations of 1410 may be performed in accordance with examples as disclosed herein. In some examples, aspects of the operations of 1410 may be performed by a system information component 830 as described with reference to FIG. 8.

At 1415, the method may include communicating with the network entity according to a timing that is based on the TA command received via the system information message. The operations of 1415 may be performed in accordance with examples as disclosed herein. In some examples, aspects of the operations of 1415 may be performed by a communications component 835 as described with reference to FIG. 8.

Figure 15:
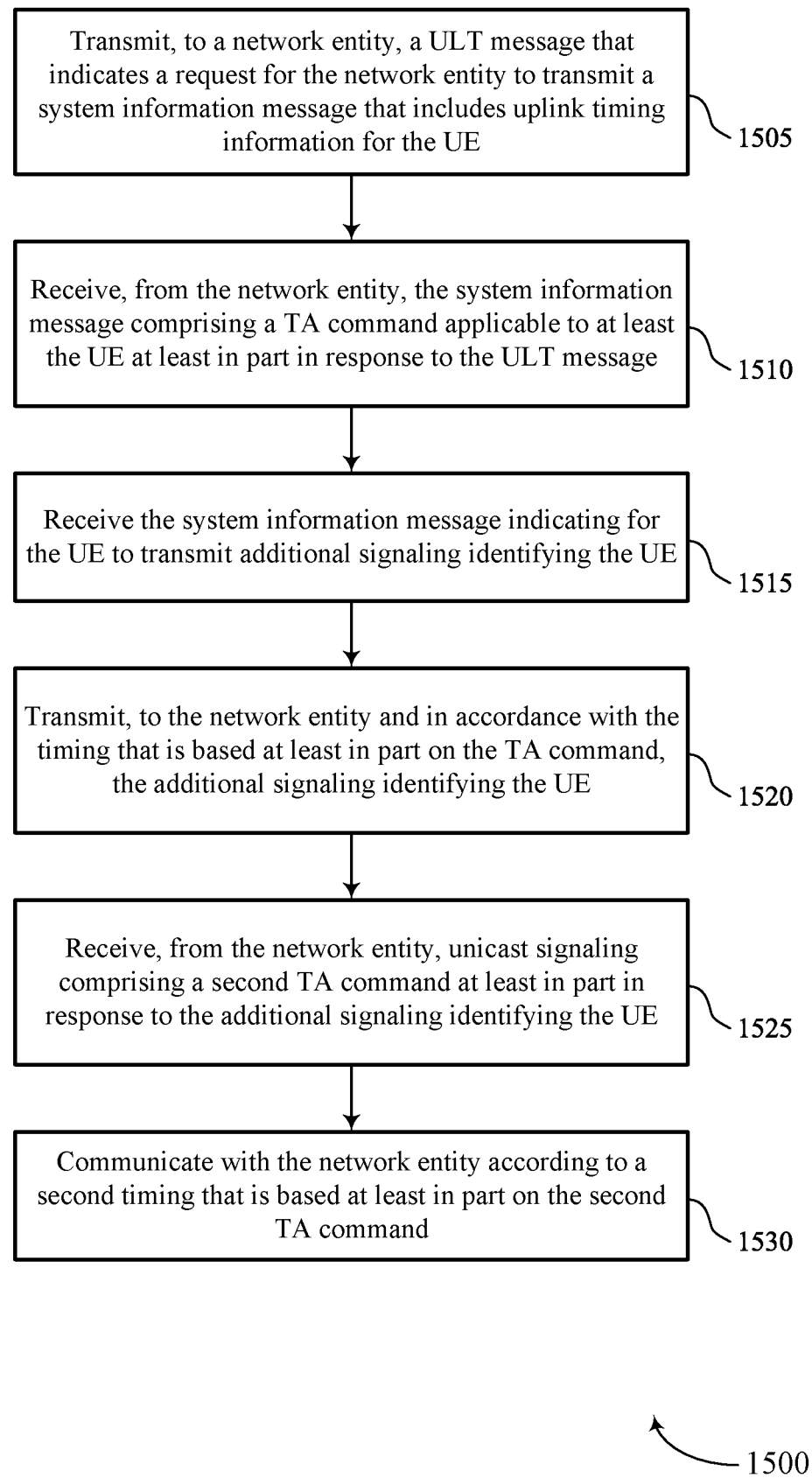

FIG. 15 shows a flowchart illustrating a method 1500 that supports communicating timing information via system information in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, a ULT message that indicates a request for the network entity to transmit a system information message that includes uplink timing information for the UE. The operations of 1505 may be performed in accordance with examples as disclosed herein. In some examples, aspects of the operations of 1505 may be performed by a ULT component 825 as described with reference to FIG. 8.

At 1510, the method may include receiving, from the network entity, the system information message including a TA command applicable to at least the UE at least in part in response to the ULT message. The operations of 1510 may be performed in accordance with examples as disclosed herein. In some examples, aspects of the operations of 1510 may be performed by a system information component 830 as described with reference to FIG. 8.

At 1515, the method may include receiving the system information message indicating for the UE to transmit additional signaling identifying the UE. The operations of 1515 may be performed in accordance with examples as disclosed herein. In some examples, aspects of the operations of 1515 may be performed by a system information component 830 as described with reference to FIG. 8.

At 1520, the method may include transmitting, to the network entity and in accordance with the timing that is based on the TA command, the additional signaling identifying the UE. The operations of 1520 may be performed in accordance with examples as disclosed herein. In some examples, aspects of the operations of 1520 may be performed by an additional signaling component 840 as described with reference to FIG. 8.

At 1525, the method may include receiving, from the network entity, unicast signaling including a second TA command at least in part in response to the additional signaling identifying the UE. The operations of 1525 may be performed in accordance with examples as disclosed herein. In some examples, aspects of the operations of 1525 may be performed by a unicast signaling component 845 as described with reference to FIG. 8.

At 1530, the method may include communicating with the network entity according to a second timing that is based on the second TA command. The operations of 1530 may be performed in accordance with examples as disclosed herein. In some examples, aspects of the operations of 1530 may be performed by a communications component 835 as described with reference to FIG. 8.

Figure 16:
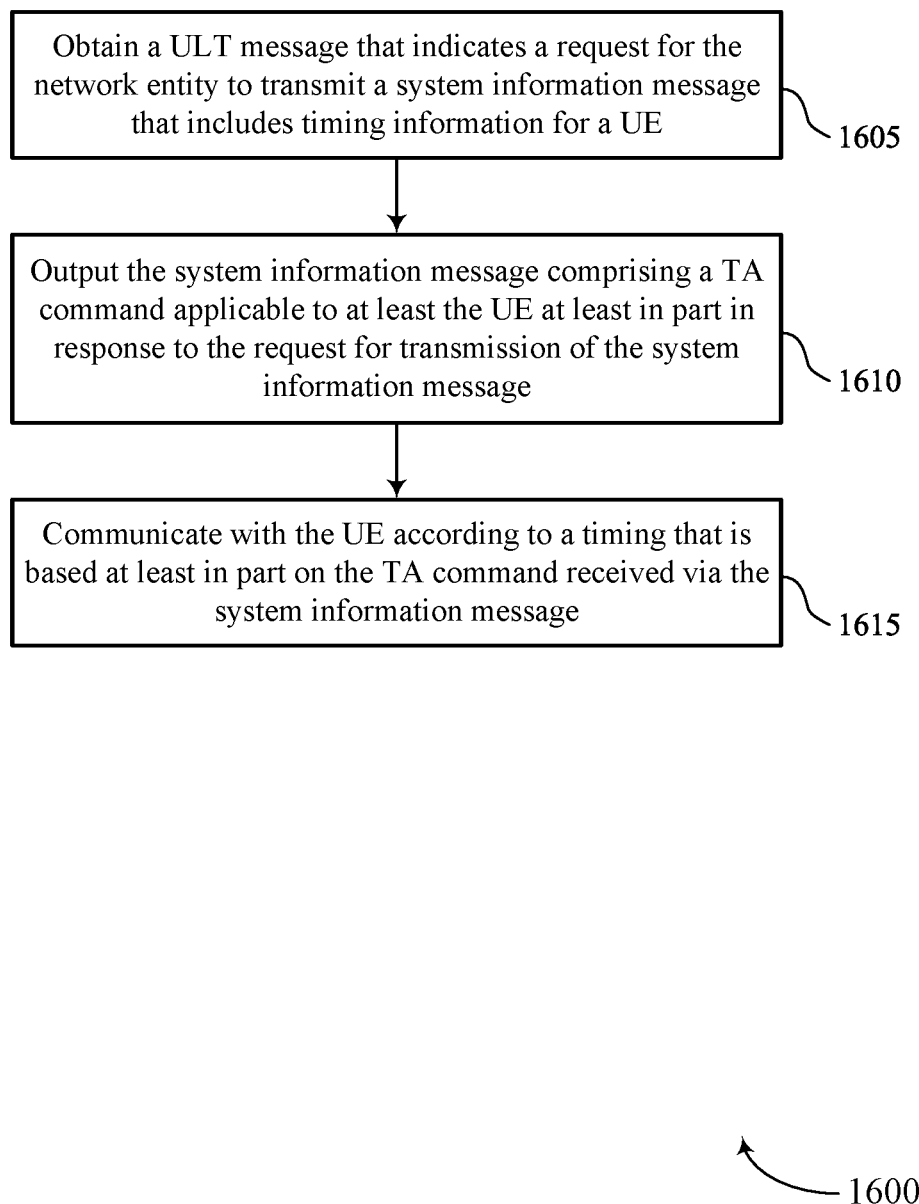

FIG. 16 shows a flowchart illustrating a method 1600 that supports communicating timing information via system information in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include obtaining a ULT message that indicates a request for the network entity to transmit a system information message that includes timing information for a UE. The operations of 1605 may be performed in accordance with examples as disclosed herein. In some examples, aspects of the operations of 1605 may be performed by a ULT component 1225 as described with reference to FIG. 12.

At 1610, the method may include outputting the system information message including a TA command applicable to at least the UE at least in part in response to the request for transmission of the system information message. The operations of 1610 may be performed in accordance with examples as disclosed herein. In some examples, aspects of the operations of 1610 may be performed by a system information component 1230 as described with reference to FIG. 12.

At 1615, the method may include communicating with the UE according to a timing that is based on the TA command received via the system information message. The operations of 1615 may be performed in accordance with examples as disclosed herein. In some examples, aspects of the operations of 1615 may be performed by a communications component 1235 as described with reference to FIG. 12.

Figure 17:
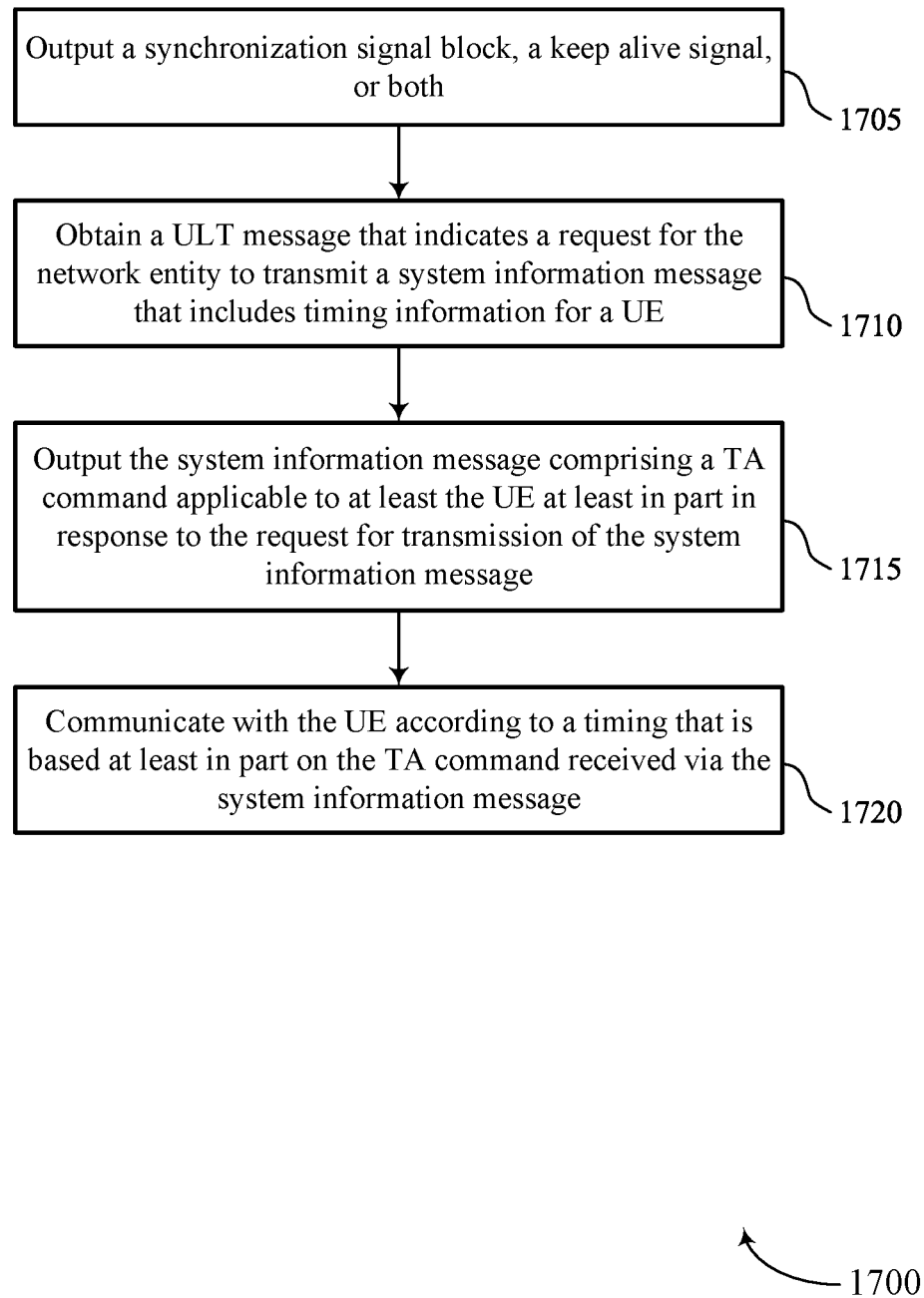

FIG. 17 shows a flowchart illustrating a method 1700 that supports communicating timing information via system information in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting a SSB, a KAS, or both. The operations of 1705 may be performed in accordance with examples as disclosed herein. In some examples, aspects of the operations of 1705 may be performed by an SSB/KAS detection component 1255 as described with reference to FIG. 12.

At 1710, the method may include obtaining a ULT message that indicates a request for the network entity to transmit a system information message that includes timing information for a UE. The operations of 1710 may be performed in accordance with examples as disclosed herein. In some examples, aspects of the operations of 1710 may be performed by a ULT component 1225 as described with reference to FIG. 12.

At 1715, the method may include outputting the system information message including a TA command applicable to at least the UE at least in part in response to the request for transmission of the system information message. The operations of 1715 may be performed in accordance with examples as disclosed herein. In some examples, aspects of the operations of 1715 may be performed by a system information component 1230 as described with reference to FIG. 12.

At 1720, the method may include communicating with the UE according to a timing that is based on the TA command received via the system information message. The operations of 1720 may be performed in accordance with examples as disclosed herein. In some examples, aspects of the operations of 1720 may be performed by a communications component 1235 as described with reference to FIG. 12.

The following provides an overview of aspects of the present disclosure:

Aspect 1: A method for wireless communication at a UE, comprising: transmitting, to a network entity, a ULT message that indicates a request for the network entity to transmit a system information message that includes uplink timing information for the UE; receiving, from the network entity, the system information message comprising a TA command applicable to at least the UE at least in part in response to the ULT message; and communicating with the network entity according to a timing that is based at least in part on the TA command received via the system information message.

Aspect 2: The method of aspect 1, wherein receiving the system information message comprises: receiving the system information message indicating the TA command is applicable to a group of UEs comprising the UE and one or more additional UEs.

Aspect 3: The method of aspect 2, wherein the one or more additional UEs have each requested the system information message via respective ULT messages, the respective ULT messages and the ULT message having a same format.

Aspect 4: The method of any of aspects 2 through 3, wherein the TA command is based at least in part on a smallest round trip delay associated with UEs of the group of UEs.

Aspect 5: The method of aspect 1, wherein receiving the system information message comprises: receiving the system information message indicating a set of one or more additional TA commands each applicable to a respective additional UE of one or more additional UEs.

Aspect 6: The method of aspect 5, wherein the one or more additional UEs have each requested the system information message via respective ULT messages, the respective ULT messages and the ULT message having different formats.

Aspect 7: The method of any of aspects 5 through 6, further comprising: transmitting the ULT message indicating an ID of the UE in association with the request to transmit the system information message; and receiving the system information message indicating that the TA command is associated with the ID of the UE.

Aspect 8: The method of any of aspects 1 through 7, further comprising: receiving the system information message indicating for the UE to transmit additional signaling identifying the UE; transmitting, to the network entity and in accordance with the timing that is based at least in part on the TA command, the additional signaling identifying the UE; receiving, from the network entity, unicast signaling comprising a second TA command at least in part in response to the additional signaling identifying the UE; and communicating with the network entity according to a second timing that is based at least in part on the second TA command.

Aspect 9: The method of aspect 8, wherein the system information message indicates for the UE to transmit the additional signaling identifying the UE based at least in part on a difference in timing between the request for transmission of the system information message from the UE and an additional request for transmission of the system information message from an additional UE.

Aspect 10: The method of any of aspects 8 through 9, wherein the system information message indicates for the UE to transmit the additional signaling identifying the UE based at least in part on a collision between the request for transmission of the system information message from the UE and an additional request for transmission of the system information message from an additional UE.

Aspect 11: The method of any of aspects 1 through 10, wherein the system information message comprises a SSB, a SIB, MSI, or any combination thereof.

Aspect 12: The method of any of aspects 1 through 11, wherein transmitting the request to transmit the system information message comprises: transmitting the request via a RACH.

Aspect 13: The method of any of aspects 1 through 12, wherein transmitting the request to transmit the system information message comprises: transmitting the request based at least in part on detecting a SSB associated with the network entity, a keep alive signal associated with the network entity, or both.

Aspect 14: A method for wireless communication at a network entity, comprising: obtaining a ULT message that indicates a request for the network entity to transmit a system information message that includes timing information for a UE; outputting the system information message comprising a TA command applicable to at least the UE at least in part in response to the request for transmission of the system information message; and communicating with the UE according to a timing that is based at least in part on the TA command received via the system information message.

Aspect 15: The method of aspect 14, wherein outputting the system information message comprises: outputting the system information message indicating the TA command is applicable to a group of UEs comprising the UE and one or more additional UEs.

Aspect 16: The method of aspect 15, wherein the one or more additional UEs have each requested the system information message via respective ULT messages, the respective ULT messages and the ULT message having a same format.

Aspect 17: The method of any of aspects 15 through 16, wherein the TA command is based at least in part on a smallest round trip delay associated with UEs of the group of UEs.

Aspect 18: The method of aspect 14, wherein outputting the system information message comprises: outputting the system information message indicating a set of one or more additional TA commands each applicable to a respective additional UE of one or more additional UEs.

Aspect 19: The method of aspect 18, wherein the one or more additional UEs have each requested the system information message via respective ULT messages, the respective ULT messages and the ULT message having different formats.

Aspect 20: The method of any of aspects 18 through 19, further comprising: obtaining the ULT message indicating an ID of the UE in association with the request to transmit the system information message; and outputting the system information message indicating that the TA command is associated with the ID of the UE.

Aspect 21: The method of any of aspects 14 through 20, further comprising: outputting the system information message indicating for the UE to transmit additional signaling identifying the UE; obtaining, in accordance with the timing that is based at least in part on the TA command, the additional signaling identifying the UE; outputting unicast signaling comprising a second TA command at least in part in response to the additional signaling identifying the UE; and communicating with the UE according to a second timing that is based at least in part on the second TA command.

Aspect 22: The method of aspect 21, wherein the system information message indicates for the UE to transmit the additional signaling identifying the UE based at least in part on a difference in timing between the request for transmission of the system information message from the UE and an additional request for transmission of the system information message from an additional UE.

Aspect 23: The method of any of aspects 21 through 22, wherein the system information message indicates for the UE to transmit the additional signaling identifying the UE based at least in part on a collision between the request for transmission of the system information message from the UE and an additional request for transmission of the system information message from an additional UE.

Aspect 24: The method of any of aspects 14 through 23, wherein the system information message comprises a SSB, a SIB, MSI, or any combination thereof.

Aspect 25: The method of any of aspects 14 through 24, wherein obtaining the request to transmit the system information message comprises: obtaining the request via a RACH.

Aspect 26: The method of any of aspects 14 through 25, further comprising: outputting a SSB, a keep alive signal, or both, wherein the ULT message indicating the request for the network entity to transmit the system information message is based at least in part on the SSB, the keep alive signal, or both.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a network entity, comprising a processor; memory coupled with the processor; and instructions stored in the memory and executable by the processor to cause the apparatus to perform a method of any of aspects 14 through 26.

Aspect 31: An apparatus for wireless communication at a network entity, comprising at least one means for performing a method of any of aspects 14 through 26.

Aspect 32: A non-transitory computer-readable medium storing code for wireless communication at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      transmit, to a network entity, an uplink trigger message that indicates a request for the network entity to transmit a system information message that includes uplink timing information for the UE;
      receive, from the network entity, the system information message comprising a timing advance command applicable to at least the UE at least in part in response to the uplink trigger message, wherein the system information message indicates for the UE to transmit additional signaling identifying the UE based at least in part on a difference in timing between the request for transmission of the system information message from the UE and an additional request for transmission of the system information message from an additional UE; and
      communicate with the network entity according to a timing that is based at least in part on the timing advance command received via the system information message.

2. The apparatus of claim 1, wherein the instructions to receive the system information message are executable by the processor to cause the apparatus to:
   receive the system information message indicating the timing advance command is applicable to a group of UEs comprising the UE and one or more additional UEs including the additional UE.

3. The apparatus of claim 2, wherein the one or more additional UEs have each requested the system information message via respective uplink trigger messages, the respective uplink trigger messages and the uplink trigger message having a same format.

4. The apparatus of claim 2, wherein the timing advance command is based at least in part on a smallest round trip delay associated with UEs of the group of UEs.

5. The apparatus of claim 1, wherein the instructions to receive the system information message are executable by the processor to cause the apparatus to:
   receive the system information message indicating a set of one or more additional timing advance commands each applicable to a respective additional UE of one or more additional UEs including the additional UE.

6. The apparatus of claim 5, wherein the one or more additional UEs have each requested the system information message via respective uplink trigger messages, the respective uplink trigger messages and the uplink trigger message having different formats.

7. The apparatus of claim 5, wherein the instructions are further executable by the processor to cause the apparatus to:
   transmit the uplink trigger message indicating an identifier of the UE in association with the request to transmit the system information message; and
   receive the system information message indicating that the timing advance command is associated with the identifier of the UE.

8. The apparatus of claim 1, wherein the instructions are further executable by the processor to cause the apparatus to:
   transmit, to the network entity and in accordance with the timing that is based at least in part on the timing advance command, the additional signaling identifying the UE;
   receive, from the network entity, unicast signaling comprising a second timing advance command at least in part in response to the additional signaling identifying the UE; and
   communicate with the network entity according to a second timing that is based at least in part on the second timing advance command.

9. The apparatus of claim 1, wherein the system information message comprises a synchronization system block, a system information block, minimum system information, or any combination thereof.

10. The apparatus of claim 1, wherein the instructions to transmit the request to transmit the system information message are executable by the processor to cause the apparatus to:
   transmit the request via a random access channel.

11. The apparatus of claim 1, wherein the instructions to transmit the request to transmit the system information message are executable by the processor to cause the apparatus to:

transmit the request based at least in part on detecting a synchronization signal block associated with the network entity, a keep alive signal associated with the network entity, or both.

12. An apparatus for wireless communication at a network entity, comprising:

a processor;

memory coupled with the processor; and instructions stored in the memory and executable by the processor to cause the apparatus to:

obtain an uplink trigger message that indicates a request for the network entity to transmit a system information message that includes timing information for a user equipment (UE);

output the system information message comprising a timing advance command applicable to at least the UE at least in part in response to the request for transmission of the system information message, wherein the system information message indicates for the UE to transmit additional signaling identifying the UE based at least in part on a difference in timing between the request for transmission of the system information message from the UE and an additional request for transmission of the system information message from an additional UE; and communicate with the UE according to a timing that is based at least in part on the timing advance command received via the system information message.

13. The apparatus of claim 12, wherein the instructions to output the system information message are executable by the processor to cause the apparatus to:

output the system information message indicating the timing advance command is applicable to a group of UEs comprising the UE and one or more additional UEs including the additional UE.

14. The apparatus of claim 13, wherein the one or more additional UEs have each requested the system information message via respective uplink trigger messages, the respective uplink trigger messages and the uplink trigger message having a same format.

15. The apparatus of claim 13, wherein the timing advance command is based at least in part on a smallest round trip delay associated with UEs of the group of UEs.

16. The apparatus of claim 12, wherein the instructions to output the system information message are executable by the processor to cause the apparatus to:

output the system information message indicating a set of one or more additional timing advance commands each applicable to a respective additional UE of one or more additional UEs including the additional UE.

17. The apparatus of claim 16, wherein the one or more additional UEs have each requested the system information message via respective uplink trigger messages, the respective uplink trigger messages and the uplink trigger message having different formats.

18. The apparatus of claim 16, wherein the instructions are further executable by the processor to cause the apparatus to:

obtain the uplink trigger message indicating an identifier of the UE in association with the request to transmit the system information message; and output the system information message indicating that the timing advance command is associated with the identifier of the UE.

19. The apparatus of claim 12, wherein the instructions are further executable by the processor to cause the apparatus to:

obtain, in accordance with the timing that is based at least in part on the timing advance command, the additional signaling identifying the UE;

output unicast signaling comprising a second timing advance command at least in part in response to the additional signaling identifying the UE; and communicate with the UE according to a second timing that is based at least in part on the second timing advance command.

20. The apparatus of claim 12, wherein the system information message comprises a synchronization signal block, a system information block, minimum system information, or any combination thereof.

21. The apparatus of claim 12, wherein the instructions to obtain the request to transmit the system information message are executable by the processor to cause the apparatus to:

obtain the request via a random access channel.

22. The apparatus of claim 12, wherein the instructions are further executable by the processor to cause the apparatus to:

output a synchronization signal block, a keep alive signal, or both, wherein the uplink trigger message indicating the request for the network entity to transmit the system information message is based at least in part on the synchronization signal block, the keep alive signal, or both.

23. A method for wireless communication at a user equipment (UE), comprising:

transmitting, to a network entity, an uplink trigger message that indicates a request for the network entity to transmit a system information message that includes uplink timing information for the UE;

receiving, from the network entity, the system information message comprising a timing advance command applicable to at least the UE at least in part in response to the uplink trigger message, wherein the system information message indicates for the UE to transmit additional signaling identifying the UE based at least in part on a difference in timing between the request for transmission of the system information message from the UE and an additional request for transmission of the system information message from an additional UE; and communicating with the network entity according to a timing that is based at least in part on the timing advance command received via the system information message.

24. The method of claim 23, wherein receiving the system information message comprises:

receiving the system information message indicating the timing advance command is applicable to a group of UEs comprising the UE and one or more additional UEs including the additional UE.

25. A method for wireless communication at a network entity, comprising:

obtaining an uplink trigger message that indicates a request for the network entity to transmit a system information message that includes timing information for a user equipment (UE);

outputting the system information message comprising a timing advance command applicable to at least the UE at least in part in response to the request for transmission of the system information message, wherein the system information message indicates for the UE to transmit additional signaling identifying the UE based at least in part on a difference in timing between the request for transmission of the system information message from the UE and an additional request for transmission of the system information message from an additional UE; and communicating with the UE according to a timing that is based at least in part on the timing advance command received via the system information message.

26. The method of claim 25, wherein outputting the system information message comprises:

outputting the system information message indicating a set of one or more additional timing advance commands each applicable to a respective additional UE of one or more additional UEs including the additional UE.

* * * * *